(12) United States Patent
Shi

(10) Patent No.: US 12,366,640 B2
(45) Date of Patent: Jul. 22, 2025

(54) LiDAR THRESHOLD ADJUSTMENT METHOD, APPARATUS, LiDAR AND STORAGE MEDIUM

(71) Applicant: SUTENG INNOVATION TECHNOLOGY CO., LTD., Shenzhen (CN)

(72) Inventor: Zhaohui Shi, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/945,473

(22) Filed: Nov. 12, 2024

(65) Prior Publication Data
US 2025/0216520 A1  Jul. 3, 2025

(30) Foreign Application Priority Data

Dec. 29, 2023 (CN) .......................... 202311855661.8

(51) Int. Cl.
*G01S 7/487* (2006.01)
*G01S 17/10* (2020.01)

(52) U.S. Cl.
CPC ............ *G01S 7/4873* (2013.01); *G01S 17/10* (2013.01)

(58) Field of Classification Search
CPC ............................... G01S 7/4873; G01S 17/10
USPC ............................................................ 702/85
See application file for complete search history.

(56) References Cited

U.S. PATENT DOCUMENTS

| | | | |
|---|---|---|---|
| 11,415,682 B1 * | 8/2022 | Clark .................... | G01S 7/4861 |
| 2020/0182985 A1 * | 6/2020 | Wu ......................... | G01S 17/14 |
| 2023/0121544 A1 * | 4/2023 | Shi ......................... | G01S 7/4873 356/4.01 |
| 2023/0400577 A1 * | 12/2023 | Gong .................... | G01S 7/4808 |

\* cited by examiner

*Primary Examiner* — John H Le
(74) *Attorney, Agent, or Firm* — BAYES PLLC

(57) ABSTRACT

The present application provides a threshold adjustment method, a device, a LiDAR, and a storage medium for a LiDAR. The method includes: obtaining a set of noise quantities detected by the LiDAR in a blanking period, where the blanking period is a time period from a scanning end position to a scanning start position in a detection cycle of the LiDAR, and the noise quantity is a signal quantity obtained by sampling a received signal output by ae receiving device based on the test threshold value; based on at least one of candidate baseline depression values, determining a threshold down adjustment amount; and based on the threshold down adjustment amount, determining a threshold following curve of the receiving device.

13 Claims, 14 Drawing Sheets

Method 200

During the execution of the $i^{th}$ threshold traversal, obtaining a set of noise quantities detected by the LiDAR in a blanking period, where the set of noise quantities includes M noise quantities corresponding to M test threshold values — 201

Determining the test threshold value corresponding to the maximum noise quantity in the set of noise quantities as the $i^{th}$ candidate baseline depression value, where i is a positive integer — 202

Determining a threshold down adjustment amount based on at least one candidate baseline depression value — 203

Determining a threshold following curve of the receiving device based on the threshold down adjustment amount — 204

LiDAR THRESHOLD ADJUSTMENT METHOD, APPARATUS, LiDAR AND STORAGE MEDIUM

CROSS-REFERENCE TO RELATED APPLICATION

The present application claims the benefit of priority to Chinese Patent Application No. 202311855661.8, filed on Dec. 29, 2023, which is hereby incorporated by reference in its entirety.

TECHNICAL FIELD

The present application relates to the field of LiDAR technology, and particularly, relates to a LiDAR threshold adjustment method, apparatus, LiDAR, and storage medium in the field of LiDAR technology.

BACKGROUND

LiDAR is a radar system that emits laser beams to detect position, speed, and other characteristic values of a target. First emit a detection laser to the target, and then compare the received echo signal reflected from the target with the emitted signal. After processing, the relevant information of the target can be obtained.

The installation scenarios of a LiDAR are diverse and complex, requiring the LiDAR to be applicable to various harsh environments, such as rain, snow, dust, wind, and sand. These environments can easily cause the LiDAR optical path to become dirty, resulting in inaccurate LiDAR detection.

The probability of contamination of the internal optical path of the LiDAR is reduced by improving the internal mechanical structure of the LiDAR, but it still cannot meet the distance measurement accuracy requirements after the internal optical path of the LiDAR is contaminated.

SUMMARY

Embodiments of the present application provide a threshold adjustment method, an apparatus, a LiDAR, and storage medium of a LiDAR, which can dynamically adjust a threshold value of the LiDAR to further improve the ranging accuracy of the LiDAR.

In a first aspect, a threshold adjustment method for a LiDAR is provided, including:
  during execution of an $i^{th}$ threshold traversal, obtaining a set of noise quantities detected by the LiDAR in a blanking period, where the set of noise quantities includes M noise quantities corresponding to M test threshold values; where the blanking period is a time period from a scanning end position to a scanning start position within a detection cycle of the LiDAR, and the noise quantity is a signal quantity obtained by sampling a received signal output by a receiving device based on the test threshold value;
  determining a test threshold value corresponding to the maximum value of the noise quantity in the set of noise quantities as an $i^{th}$ candidate baseline depression value, where i is a positive integer;
  determining a threshold down adjustment amount based on at least one of the candidate baseline depression values; and
  determining a threshold following curve of the receiving device based on the threshold down adjustment amount.

In a second aspect, a threshold adjustment apparatus for a LiDAR is provided, including:
  a first obtaining module, configured to obtain a set of noise quantities detected by the LiDAR in a blanking period, during the execution of an $i^{th}$ threshold traversal, where the set of noise quantities includes M noise quantities corresponding to M test threshold values; where the blanking period is a time period from a scanning end position to a scanning start position within a detection cycle of the LiDAR, and the noise quantity is a signal quantity obtained by sampling a received signal output by a receiving device based on the test threshold value;
  a first determining module, configured to determine a test threshold value corresponding to the maximum value of the noise quantity in the set of noise quantities as an $i^{th}$ candidate baseline depression value, where i is a positive integer;
  a second determining module, configured to determine a threshold down adjustment amount based on at least one of the candidate baseline depression values; and
  a third determining module, configured to determine a threshold following curve of the receiving device based on the threshold down adjustment amount.

In a third aspect, a LiDAR is provided, which includes: a processor and a memory; where the memory stores executable program code, and the executable program code is suitable for being loaded by the processor and executing the LiDAR threshold adjustment method.

In a fourth aspect, a computer-readable storage medium is provided, which stores a computer program code. When the computer program code runs on a computer, the computer executes the threshold adjustment method of the LiDAR.

Embodiments of the present application provide a method for dynamically adjusting the corresponding threshold of the LiDAR: by traversing several test threshold values during the blanking period of the LiDAR, the quantities of noise detected based on each test threshold value is obtained; according to the relationship between the test threshold value-baseline-noise quantities, the test threshold value with the largest quantity of noise in the set of noise quantities obtained during the threshold traversal is determined as the candidate baseline depression value; according to the relationship between the baseline and the threshold, the threshold down adjustment amount and the threshold following curve are determined by the candidate baseline depression value threshold adjustment method, the detection of the baseline depression value and the update of the threshold following curve are realized during the operation of the LiDAR, avoiding the problem of reduced laser detection accuracy and reduced ranging capability caused by abnormal baseline sag and fixed threshold, so as to improve the target object detection capability of the LiDAR under the condition of abnormal baseline depression.

BRIEF DESCRIPTION OF DRA WINGS

DETAILED DESCRIPTION

The technical solution will be described clearly below in conjunction with the accompanying drawings. In the description of the embodiments of the present application, unless otherwise specified, "/" means or, for example, A/B can mean A or B: "and/or" in the text is only a description of the association relationship of associated objects, indicating that there can be three relationships, for example, A and/or B can mean: A exists alone, A and B exist at the same time, and B exists alone. In addition, in the description of the embodiments of the present application, "multiple" means two or more than two.

The terms "first" and "second" are used for descriptive purposes only and are not to be understood as suggesting or implying relative importance or implicitly indicating the number of technical features indicated. Thus, a feature defined as "first" or "second" may explicitly or implicitly include one or more of the features.

The working process of the LiDAR is as follows: a detection laser is emitted to the detection field of view through an emitting device, and then the receiving device (the receiving device can be called a receiving module or a receiving circuit) receives an echo signal reflected from the detection field of view, and the echo signal is processed to realize the recognition and ranging of the target object in the detection field of view. In an embodiment, the LiDAR can include a scanning device, and the detection laser emitted by the emitting device is emitted to the detection field of view through the scanning device, and the scanning device can receive the echo signal and deflect the echo signal to the receiving device.

The LiDAR is based on a detection laser and the corresponding echo signal, and after solving, a detection point (or scan point) can be obtained. The LiDAR obtains the position and shape information of the target object by scanning in a rotating, up and down, and left and right manners. By scanning at different angles (horizontal angle, vertical angle, or other direction angles), multiple scanning rows in different angles and directions can be formed.

Figure 1:
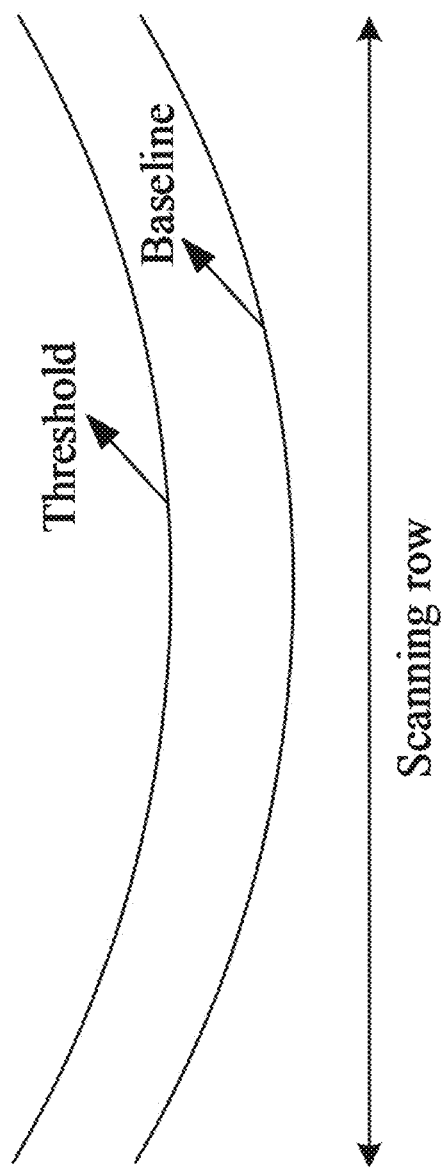
FIG. 1 is a schematic diagram of the relationship between a baseline and a threshold provided in an embodiment of the present application.

In the process of processing the echo laser, two parameters are involved, including a threshold (or threshold voltage) and a baseline (or baseline voltage). Under normal circumstances, as shown in FIG. 1, there is a standard deviation relationship between the baseline and the threshold. That is, the difference between the baseline and the threshold remains basically stable. If the baseline depresses or the baseline is abnormally low, the difference between the baseline and the threshold becomes larger, which will make it hard to sample the received signal. For example, it will be hard to detect weak signals, resulting in failing to detect low-reflectivity targets or long-distance targets, which will cause the LiDAR to detect inaccurately.

LiDAR needs to be suitable for all kinds of severe weather. Under these conditions, the radar optical path (internal optical components) of the LiDAR is contaminated. Contamination of the internal optical path will cause the optical preamble (the echo caused by the laser in the radar due to reflection and refraction when the laser is emitted) to become larger. The larger the optical preamble, the greater the energy received by the receiving circuit. The greater the received energy, the more obvious the baseline depresses, which makes the echo signal lower as the baseline becomes lower. Because a ranging threshold is a fixed value (voltage), the ranging capability will decrease when the optical path is contaminated, which will seriously affect the target recognition capability of the LiDAR.

An embodiment of the present application provides a threshold adjustment method for a LiDAR, which timely adjusts the threshold when an abnormally low baseline is identified, so as to keep the baseline and threshold in a standard deviation state as much as possible, so as to improve the ranging capability of the LiDAR when the baseline is abnormally low.

An execution subject of the threshold adjustment method of the LiDAR provided in embodiments of the present application may be a LiDAR, such as a control and processing unit inside the LiDAR, or a SOC chip inside the LiDAR; or a computer device connected to the LiDAR for communication, and the above-mentioned computer device may be a tablet, a radar auxiliary computer, a vehicle terminal, a mobile terminal, etc.

Figure 2:
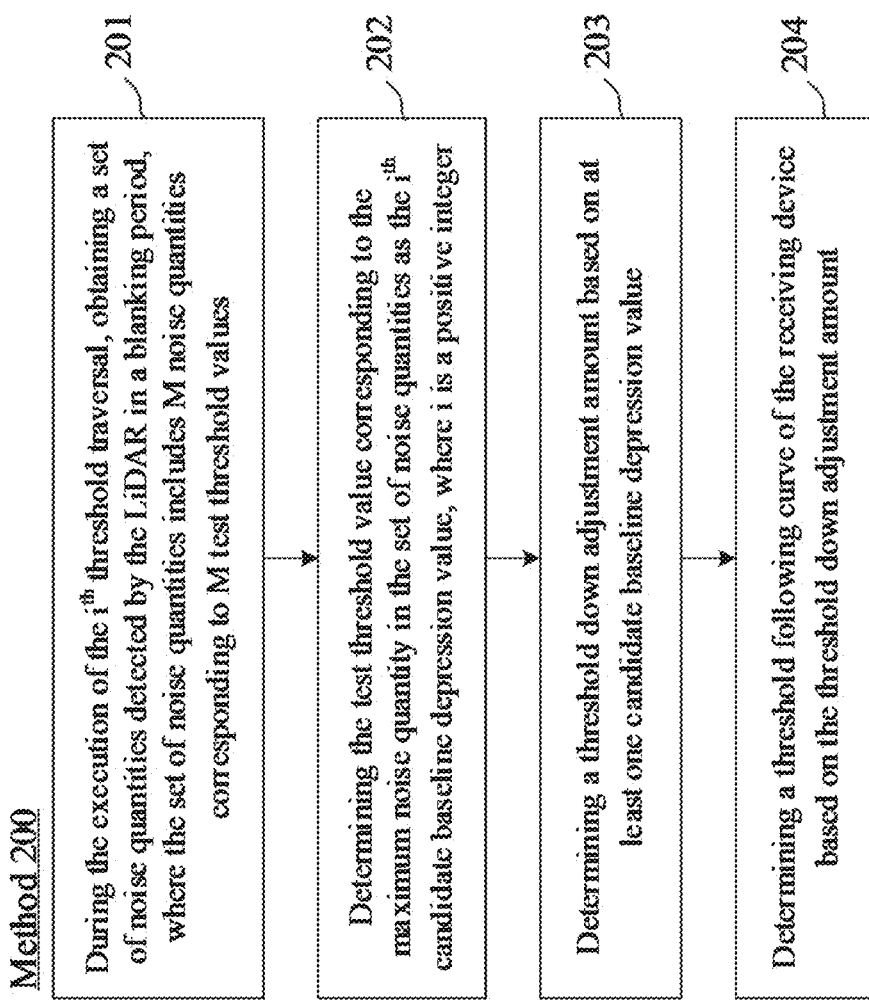
FIG. 2 is a schematic flow chart of a threshold adjustment method of a LiDAR provided in an embodiment of the present application.

FIG. 2 is a schematic flow chart of a threshold adjustment method of a LiDAR provided in an embodiment. Exemplarily, as shown in FIG. 2, the method 200 includes the following steps.

Step 201, during the execution of the $i^{th}$ threshold traversal, obtaining a set of noise quantities detected by the LiDAR in a blanking period, where the set of noise quantities includes M noise quantities corresponding to M test threshold values.

When the LiDAR uses a scanning apparatus to perform reciprocating scanning, the blanking period of the LiDAR refers to a time period when the scanning apparatus returns from a scanning end position to a scanning start position;

and the non-blanking period refers to a time period when the scanning device scans from the scanning start position to the scanning end position.

Figure 3:
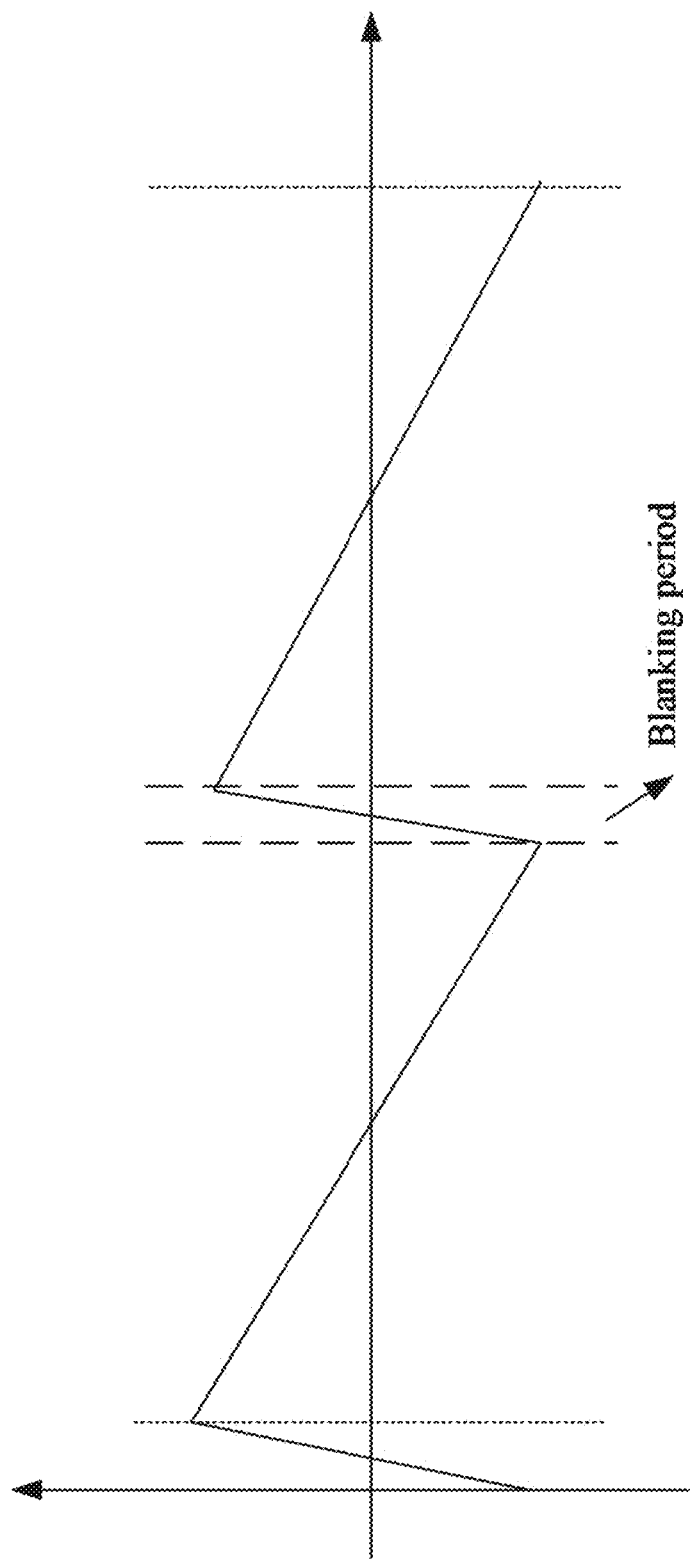
FIG. 3 is a schematic diagram of a LiDAR scanning process provided in an embodiment of the present application.

In an embodiment, a scanning device in the LiDAR using a two-dimensional galvanometer, the field of view scanning begins when the galvanometer of the LiDAR is running, and the galvanometer working state may include a scanning state and a retracing state. FIG. 3 is a schematic diagram of a LiDAR scanning process provided by an embodiment. As shown in FIG. 3, the horizontal axis in the figure is time t, and the vertical axis is a voltage value of a slow axis drive signal. If a scanning path of the galvanometer starts from the upper left corner of the field of view, when the slow axis drive signal is in the scanning area, the slow axis drive signal and the fast axis drive signal work together to make the galvanometer start scanning from the starting position until the end position of the lower left corner; during this period of time, the galvanometer is in a scanning state. Then, the slow axis drive signal enters the blanking area, and the galvanometer retraces from the end position to the starting position under the joint action of the slow axis drive signal and the fast axis drive signal, preparing to enter the scanning of the next frame; during this period of time, the galvanometer is in a retracing state. The above scanning path of the galvanometer is used as an example for explanation, and the scanning path can start from the lower left corner to the upper left corner, or from the upper right corner to the lower right corner, or from the lower right corner to the upper right corner. During the operation of the two-dimensional galvanometer, the fast-axis drive signal and the slow-axis drive signal are driven together, the fast-axis drive signal maintains a resonant state, and the slow-axis drive signal is linearly controlled. The scanning period of the LiDAR is controlled by the driving period of the slow-axis drive signal.

From the scanning process shown in FIG. 3, the period when the galvanometer is in the retracing state can be called the blanking period. That is, the blanking period is a time period from the scanning end position to the scanning start position, within the detection cycle of the LiDAR. Similarly, the non-blanking period is the time period from the scanning start position to the scanning end position in the detection cycle of the LiDAR. In an embodiment, during the blanking period, the LiDAR performs laser emission and signal reception, but does not output point cloud detection results.

The threshold adjustment process of the LiDAR involves the detection operation of the baseline depression value, and the detection operation of the baseline depression value will affect the normal scanning process of the LiDAR. In order to avoid the influence of the threshold adjustment process on the normal scanning process of the LiDAR, for the LiDAR equipped with a scanning device, the detection operation of the baseline depression value is configured to be performed during the blanking period of the LiDAR, and the normal scanning and ranging process is performed during the non-blanking period.

In an embodiment, when the LiDAR includes an emitting device and a receiving device (there is no scanning device), or when the LiDAR uses a scanning device to scan continuously, there is no process of returning from the scanning end position to the scanning start position in order to achieve the baseline depression value detection through threshold traversal during the blanking period. In an implementation, it can be configured that after every preset number of scanning cycles, at least one scanning cycle is used as a blanking period for baseline depression value detection. Exemplarily, the preset number can be 5, then after the scanning of the first 5 scanning cycles is completed, the baseline depression value detection is performed through threshold traversal in the $6^{th}$ scanning cycle; after the $6^{th}$ scanning cycle is completed, the scanning is performed normally in the $7^{th}$ to $11^{th}$ scanning cycles, and the baseline depression value detection is continued through threshold traversal in the $12^{th}$ scanning cycle; and so on, the purpose of baseline depression value detection through threshold traversal is achieved.

The baseline of the LiDAR is related to the noise distribution characteristics (the noise is distributed near the baseline), when performing the baseline depression value detection operation, an embodiment detects a baseline depression value of the current receiving device by using a threshold traversal method during the blanking period. By traversing multiple test threshold values, the quantity of noise detected under each test threshold value is determined. Since the closer the threshold is to the baseline, the more noise is detected, the current candidate baseline depression value (that is, the current candidate baseline) can be determined from the multiple test threshold values according to the quantity of noise.

In view of the baseline depression value detection operation, when calculating the baseline depression value of the current receiving device, in an implementation, during the execution of the $i^{th}$ threshold traversal, a set of noise quantities detected by the LiDAR in the blanking period can be obtained, and the noise quantity set includes M noise quantities corresponding to M test threshold values, and the noise quantity is the signal quantity obtained by sampling the received signal output by the receiving device based on the test threshold value. During each threshold traversal, it is necessary to obtain a set of noise quantities detected by the LiDAR in the blanking period, so as to confirm the candidate baseline depression value from multiple test threshold values according to the noise quantity set.

Exemplarily, the value of M is determined by a preconfigured threshold initial value, threshold end value, and test step length. The threshold initial value is the first test threshold value of the threshold traversal, the threshold end value is the last test threshold value of the threshold traversal, and the test step length is a difference between two adjacent test threshold values. The value of M can be an integer greater than 1, for example, the value of M is 10.

Step 202: determining the test threshold value corresponding to the maximum noise quantity in the set of noise quantities as the $i^{th}$ candidate baseline depression value, where i is a positive integer.

Since the closer the test threshold value is to the baseline, the more signals the LiDAR can detect, if the test threshold value is lower than the baseline, there is no signal, and the test threshold value with the larger number of detected signals can be determined as the baseline depression value of the current receiving device (referred to as the current baseline value of the receiving device). In an implementation, after obtaining the noise quantity set obtained after this threshold traversal, the noise quantities corresponding to each test threshold value in the noise quantity set can be compared, and the test threshold value corresponding to the maximum noise quantity in the noise quantity set can be determined as the $i^{th}$ candidate baseline depression value obtained by this threshold traversal, where i is a positive integer.

Exemplarily, if the noise quantity set A={20, 40, 50, 60, 70, 100, 2, 1, 0), the test threshold value corresponding to 100 can be determined as the candidate baseline depression value.

Figure 4:
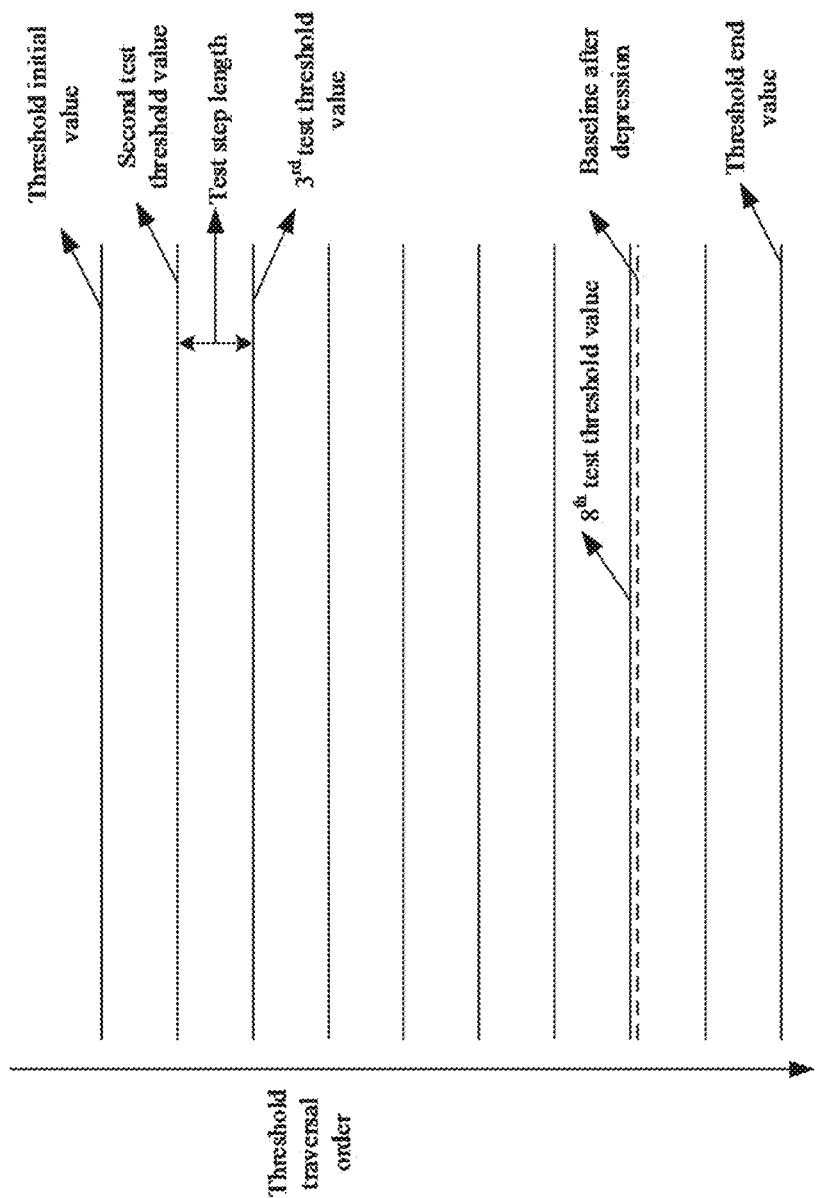
FIG. 4 is a schematic diagram of a threshold traversal process provided by an embodiment of the present application.

FIG. 4 is a schematic diagram of a threshold traversal process provided by an embodiment of the present application. As shown in FIG. 4, taking the threshold traversal process traversing 10 test threshold values as an example (M=10), a threshold initial value and a threshold end value are pre-configured. The threshold initial value is the first test threshold value, the threshold end value is the 10th test threshold value, and a difference between adjacent test threshold values is the test step length. A quantity of noises is counted starting from the threshold initial value until the threshold end value statistics are completed, and a threshold traversal is completed. Starting from the threshold initial value, the test threshold value gradually approaches the baseline after the depression. The closer to the baseline after the depression, the bigger the quantity of noises corresponding to the test threshold value. If the test threshold value is lower than the baseline after the depression, there is no signal, and the quantity of noises approaches 0. Correspondingly, based on the quantity of noise corresponding to each test threshold value, the 8th test threshold value can be determined as the candidate baseline depression value (that is, the baseline after the depression).

The sunken baseline in FIG. 4 is only a straight line for illustrative purposes to illustrate the numerical relationship. In an embodiment, the baseline of the receiving device is an arc-shaped curve with a depression in the middle (refer to the baseline shown in FIG. 1).

In an embodiment, the threshold traversal order can be from large to small. That is, the $m^{th}$ test threshold value−test step size=the $(m+1)^{th}$ test threshold value. The threshold traversal order can also be from small to large, corresponding to the $m^{th}$ test threshold value+test step size=the $(m+1)^{th}$ test threshold value.

Step 203: determining a threshold down adjustment amount based on at least one candidate baseline depression value.

The candidate baseline depression value is the baseline value of the current LiDAR. If the baseline depresses abnormally, in order to compensate for the increase in the difference between the baseline value and the threshold value caused by the abnormal baseline depression, the current threshold value needs to be lowered so that the threshold value matches the depressed baseline value. Therefore, the amount of threshold value down adjustment is related to the amount of baseline value depression. In an implementation, after calculating the candidate baseline depression value (the current baseline value), the threshold down adjustment amount can be calculated based on the candidate baseline depression value.

In order to avoid accidental errors in baseline depress detection, or when the baseline depression is small and has little impact on ranging, adjusting the threshold will affect the ranging performance of the LiDAR. The threshold down adjustment amount is determined by at least one candidate baseline depression value to reduce the impact of accidental errors on the accuracy of threshold adjustment.

Step 204: determining a threshold following curve of the receiving device based on the threshold down adjustment amount.

After determining the threshold down adjustment amount, the threshold following curve of the receiving device can be fitted according to the threshold down adjustment amount and a threshold following formula. In an embodiment, after calculating a new threshold following curve, the LiDAR can configure the new threshold following curve before the next frame scan, so that during the next frame scan, the receiving signal output by the receiving device can be sampled and processed based on the threshold value in the threshold following curve.

Embodiment of the present application provides a method for dynamically adjusting the corresponding threshold of the LiDAR: by traversing several test threshold values in the blanking period of the LiDAR, the quantity of noise detected based on each test threshold value is obtained; according to the relationship between the test threshold value-baseline-noise quantity, the test threshold value with the largest quantity of noise in the noise quantity set obtained during the threshold traversal is determined as the candidate baseline depression value; and according to the relationship between the baseline and the threshold, the threshold down adjustment amount and the threshold following curve are determined by the candidate baseline depression value. Through the above-mentioned threshold adjustment method, the detection of the baseline depression value and the updating of the threshold following curve are realized during the operation of the LiDAR, avoiding the problem of reduced laser detection accuracy and reduced ranging capability caused by abnormal baseline depression and fixed threshold, so as to improve the target object detection capability of the LiDAR under the condition of abnormal baseline depress.

In order to improve the statistical accuracy of the noise quantity corresponding to each test threshold value and make different test threshold values comparable, for each test threshold value, it is configured to obtain the same quantity (for example, K) of candidate noise values, so that an average value of the K candidate noise values is subsequently used as the final noise quantity obtained by statistics for each test threshold value.

Figure 5:
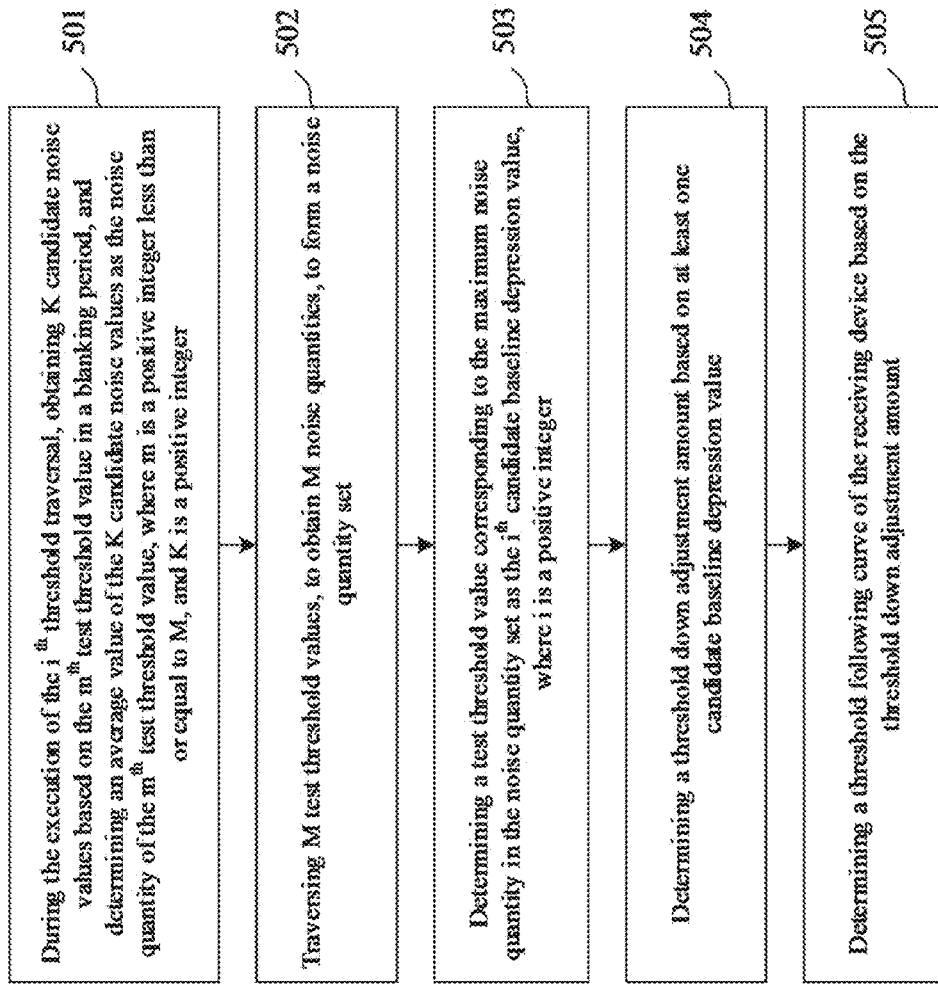
FIG. 5 is a schematic flow chart of another threshold adjustment method of a LiDAR provided in an embodiment of the present application.

FIG. 5 is a schematic flow chart of another threshold adjustment method of a LiDAR provided in an embodiment of the present application. As shown in FIG. 5, method 500 includes the following steps.

Step 501, during the execution of the $i^{th}$ threshold traversal, obtaining K candidate noise values based on the $m^{th}$ test threshold value in a blanking period, and determining an average value of the K candidate noise values as the noise quantity of the $m^{th}$ test threshold value, where m is a positive integer less than or equal to M, and K is a positive integer.

Regarding the process of obtaining candidate noise values during the blanking period: an emitting device of the LiDAR is configured not to emit detection laser, the receiving device receives the ambient light signal, the receiving device converts the received ambient light signal into an ambient electrical signal after optical-to-electrical conversion, and the ambient electrical signal is sampled and resolved using a test threshold value to obtain the candidate noise values of each detection point corresponding to the aforementioned test threshold value.

In order to make the noise quantities between multiple test threshold values comparable and avoid accidental errors, for each test threshold value, the same quantity of candidate noise values are configured for statistics, and then the final noise quantity of the test threshold value during this threshold traversal is obtained based on the average value of the candidate noise values.

Taking a $m^{th}$ test threshold value during the $i^{th}$ threshold traversal as an example, K candidate noise values obtained based on the $m^{th}$ test threshold value during the blanking period are obtained, and in order to avoid accidental errors, the average value of the K candidate noise values is determined as the noise quantity of the $m^{th}$ test threshold value.

Exemplarily, to set each test threshold value, 1,250 candidate noise values need to be counted, and the average of the 1,250 candidate noise values is taken to obtain the noise quantity corresponding to the $m^{th}$ test threshold value.

In an embodiment, when determining the noise quantity for the $m^{th}$ test threshold value, the deviations between the K candidate noise values may be determined first, and the candidate noise values with larger deviations may be removed, and the average value of the remaining candidate noise values may be determined as the noise quantity for the $m^{th}$ test threshold value, thereby avoiding the influence of the candidate noise values with larger deviations on the noise quantity statistical results.

There are multiple scan rows (lines) in a blanking period, but some scan rows will detect the target object, and the detection of the target proves that there will be an echo signal. The echo signal will cause the receiving circuit to receive more energy, causing the baseline to depress more, thus affecting the accuracy of the acquired baseline depression value. In order to improve the detection accuracy of the baseline depression value, only the scan rows (effective detection lines) where no objects are detected during the blanking period are counted for noise quantity.

In an embodiment, the step of obtaining K candidate noise values based on the $m^{th}$ test threshold value in the blanking period may further include step 501A and step 501B.

Step 501A, determining an effective detection row in the scanning rows in the blanking period.

Step 501B: counting K candidate noise values of the effective detection row according to the $m^{th}$ test threshold value.

In order to avoid counting a quantity of noises for the scan rows where the target can be detected, which may result in a larger detected baseline depression value, in one implementation, when the LiDAR counts the K candidate noise values corresponding to each test threshold value, first determine a valid detection row in the scan rows in the blanking period, the valid detection row is the scan row where the target is not detected, and then count the K candidate noise values of the valid detection row according to the current test threshold value. In other words, each test threshold value counts the candidate noise values of the valid detection row, and does not count the candidate noise values for the invalid detection row, which is the scan row where the target can be detected.

Taking the $m^{th}$ test threshold value in the $i^{th}$ threshold traversal process as an example, when obtaining the noise quantity corresponding to the $m^{th}$ test threshold value, determine the effective detection row in the scanning row in the blanking period, and count K candidate noise values of the effective detection row according to the $m^{th}$ test threshold value.

Since only valid detection rows in a blanking period are counted, and the quantity of valid detection rows in the single blanking period may not be able to meet the noise quantity statistics requirement for a single test threshold value, the noise quantity statistics corresponding to a single test threshold value may need to be completed through multiple blanking periods, that is, the noise quantity statistics for a single test threshold value may need to be completed across multiple frames.

One frame in the LiDAR scene means: the scanning device scans from the scanning start position to the scanning end position, and returns from the scanning end position to the scanning start position, to complete one frame of scanning.

If different test threshold values need to obtain the same candidate noise values, a quantity of blanking periods required for different test threshold values to complete noise quantity statistics may be different, due to the possible difference in the quantity of valid detection rows in different blanking periods. For example, the $m^{th}$ test threshold value may require 10 blanking periods to obtain K candidate noise values, while the $(m+1)^{th}$ test threshold value may require 12 blanking periods to obtain K candidate noise values. The valid candidate noise values that can be counted for each valid detection row may be different, so that the quantity of valid detection rows required for different test threshold values to complete noise quantity statistics may also be different. For example, the $m^{th}$ test threshold value may require 100 valid detection rows to obtain K candidate noise values, while the $(m+1)^{th}$ test threshold value may require 120 valid detection rows to obtain K candidate noise values.

In an embodiment, when performing effective detection row detection on the scanning rows, a first angle range is set to limit the range of effective detection row detection for each scanning row. The process of correspondingly determining effective detection row in the scanning rows in the blanking period (e.g., step 501A) may also include step 501A1 and step 501A2.

Step 501A1, when the detection point of the LiDAR is located before the first angle range of the scanning row, performing distance detection.

Step 501A2: if the scanning row is before the first angle range, the distance between the detection points and the distance between the adjacent detection points are different, the scanning row is determined as a valid detection row.

After a certain scanning row is determined to be a valid detection row, the noise value statistics of the scanning row will be performed. That is, the noise value statistics operation is performed after the valid detection row detection operation. Therefore, the configuration is to perform valid detection row detection before the first angle range of the LiDAR corresponding to the scanning row. If the scanning row is detected as a valid detection row, the noise value statistics of the valid detection row are performed within the first angle range.

The first angle range is an angle range in a first direction, and the first direction is a direction parallel to the horizontal axis. If an installation position of the LiDAR makes the horizontal axis parallel to the actual horizontal line, the first angle range can also be called the target horizontal angle range.

In an embodiment, considering that the baseline often depresses more in the middle angle range of the scanning row, in order to detect the baseline depression value more accurately and quickly, the first angle range is configured to be the middle angle range of the scanning row. Exemplarily, taking the first angle range as the target horizontal angle range as an example, if the horizontal scanning angle range corresponding to the scanning row is −50 degrees to 50 degrees, the first angle range can be −15 to 15 degrees. For each scanning row, effective detection row detection is performed between −50 degrees and −15 degrees, and if the scanning row is a valid detection row, noise quantity statistics are performed between −15 degrees and 15 degrees.

When performing effective detection row detection on a scan row, since an effective detection row refers to a scan row where no target is detected, and a scan row where a target can be detected, there are at least two adjacent detection points on the same scan row with similar distance values, so effective detection row detection can be performed by distance detection. In an implementation, for each scan row in a blanking period, if the detection point of the LiDAR is located before the first angle range of the scan row, a distance detection is performed on the detection point to determine whether there is a target in the scan row by comparing the distance similarity between adjacent detection points, and further determine whether it is a valid detection row.

Furthermore, if the LiDAR determines that before the first angle range of the scanning row, the distance of the detection point and the distance of the adjacent detection point are different, that is, there is no similar distance value between adjacent detection points, based on the correspondence between the distance similarity and the detected object, it indicates that the scanning row has not detected the target, and the scanning row can be determined as a valid detection row; after determining that the scanning row is a valid detection row, within the first angle range of the scanning row, based on the $m^{th}$ test threshold value, the quantity of noises of the detection points within the first angle range in the valid detection row is counted, to obtain at least one candidate noise value. Repeat the operation of performing valid detection row detection on multiple scanning rows, and counting the candidate noise values after determining them as valid detection rows, so that K candidate noise values corresponding to the $m^{th}$ test threshold value can be obtained by counting the quantity of noises of the detection points within the first angle range of at least one valid detection row.

For example, if the $m^{th}$ test threshold value needs to count 1250 candidate noise values, each valid detection row includes 10 detection points within the first angle range, and a maximum of 10 noise values can be counted, then the $m^{th}$ test threshold value needs to count at least 125 valid detection rows to complete the noise quantity statistics of the $m^{th}$ test threshold value.

If the LiDAR determines that before the first angle range of the scanning row, after solving a detection point, it detects whether the distance between the detection point and the adjacent detection point is similar. If not, continue to solve the next detection point for distance detection; if the distance of the detected detection point is similar to the distance of the adjacent detection point, that is, there is an adjacent detection point with similar distance values, it means that the scanning row detects the target, and the scanning row can be determined as an invalid detection row, and the noise value statistics of the scanning row are not performed. In addition, in order to reduce the investment of computing resources, when it is detected that the distance of a detection point is similar to the distance of the adjacent detection point, there is no need to execute the distance detection process of the subsequent detection point, and continue to perform effective detection row detection on the next scanning row.

Figure 6:
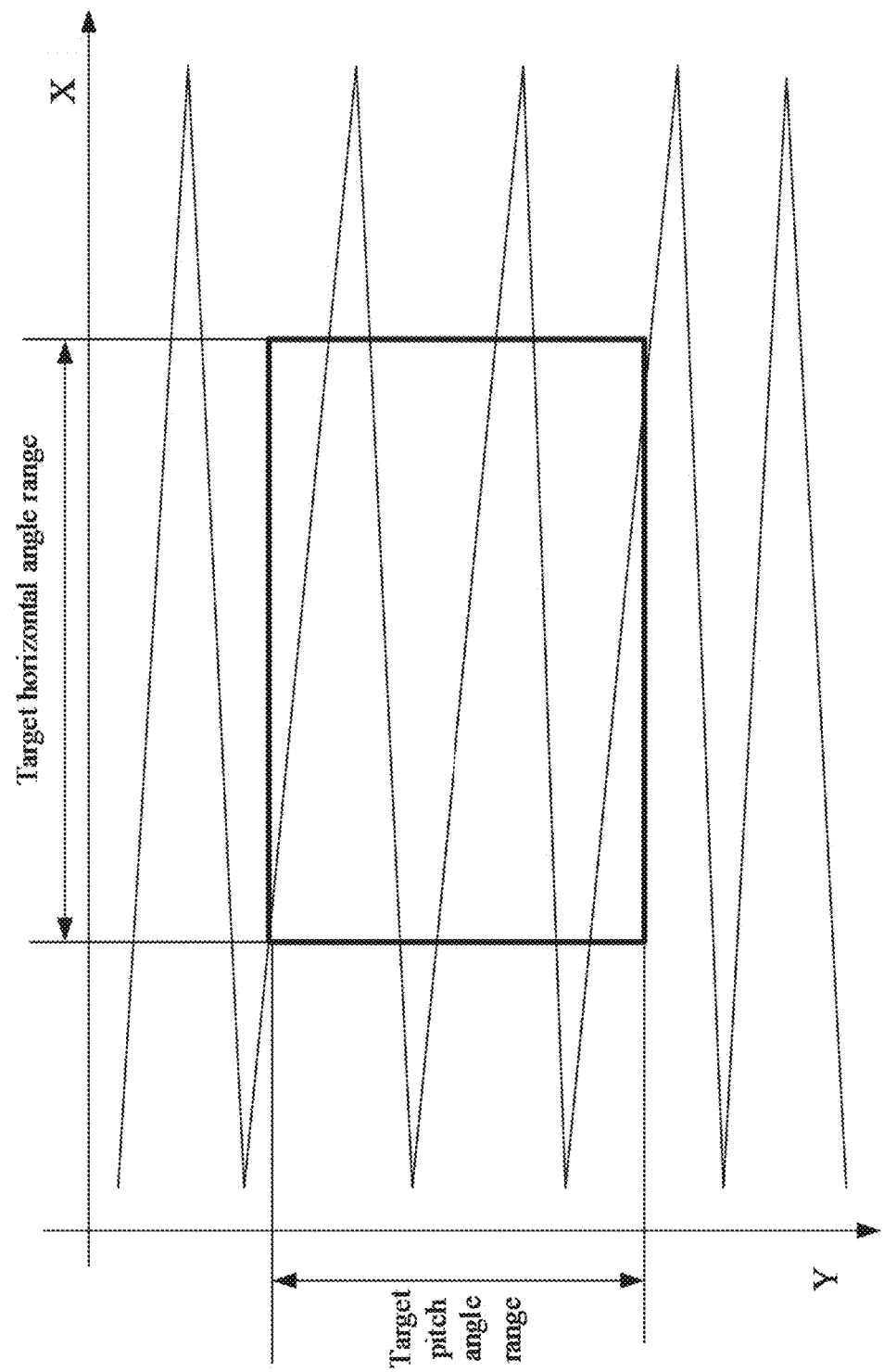
FIG. 6 is a schematic diagram of a noise quantity statistical range provided in an embodiment of the present application.

As shown in FIG. 6, taking the case where the first angle range is the target horizontal angle range as an example, for each scanning row in the blanking period, a distance detection is performed on the detection point located before the target horizontal angle range to determine whether the scanning row is a valid detection row. After determining that the scanning row is a valid detection row, the quantity of noises at the detection point is counted within the target horizontal angle range. If a detection point is detected before the target horizontal angle range and the distance between the adjacent detection point is similar, the scanning behavior is determined to be an invalid detection row, and the distance detection of subsequent detection points and the noise quantity counting process within the target horizontal angle range are not performed.

The LiDAR can stop counting the quantity of noises in the last multiple scanning rows in the blanking period. Taking FIG. 6 as an example, the blanking period includes 10 scanning rows scanned from bottom to top. The $1^{st}$ to $8^{th}$ scanning rows are judged as valid detection rows, and the quantity of noises of the detection points is counted within the target horizontal angle range for the scanning rows determined as valid detection rows. For the last two scanning rows in the blanking period, that is, the $9^{th}$ and $10^{th}$ lines at the top of FIG. 6, the judgment of the valid detection rows and the quantity of noises are stopped to adjust the recovery threshold value, and prepare for the scanning detection in the next non-blanking period of the next cycle.

In an embodiment, an effective detection row detection is performed on the scan row, and when the detection point is located before the first angle range of the scan row, the pulse width detection of the echo signal is performed. If the scan row is before the first angle range and the pulse width of the echo signal corresponding to the detection point is greater than a preset pulse width threshold, the scan row is determined as a valid detection row.

In an embodiment, an effective detection row detection is performed on the scanning row. When the detection point is located before the first angle range of the scanning row, a comprehensive judgment is made on the distance of the detection point and the pulse width of the echo signal corresponding to the detection point. If it meets the preset requirements, the scanning row is determined to be a valid detection row.

In addition to the horizontal scanning range, the LiDAR also has a vertical scanning range (or it can be called a pitch angle range). During the period when the LiDAR returns from a scanning end position to a scanning start position, the scanning speed is fast, which may cause the scanning rows with the largest pitch angle and the smallest pitch angle to be unable to be used for noise quantity statistics, or cause the noise quantity statistics to be less accurate; in order to further improve the statistical accuracy of the noise quantity, in one implementation, when the scanning row of the LiDAR is configured to be within a second angle range, perform valid detection row detection on the scan row to determine the valid detection row in the scan rows.

The second angle range is an angle range in a second direction, and the second direction is a direction parallel to the vertical axis. If the installation position of the LiDAR makes the vertical axis perpendicular to the actual horizontal line, the second angle range can be called the target pitch angle range.

The second angle range is an intermediate angle range, that is, scanning rows with larger or smaller angles are excluded, and scanning rows in the intermediate angle range are tested for effective detection rows. Exemplarily, if a vertical angle range of the LiDAR is −15 degrees to 15 degrees, the second angle range can be −5 degrees to 5 degrees, that is, for each blanking period, scanning rows between −5 degrees and 5 degrees are tested for effective detection rows, that is, for scanning rows between −5 degrees and 5 degrees, distance detection is performed before the first angle range to determine whether the scanning row is a valid detection row. If it is a valid detection row, a quantity of noise statistics for the scanning row is performed based on the test threshold value.

FIG. 6 is a schematic diagram of a noise quantity statistical range provided by an embodiment. As shown in FIG. 6, taking the first angle range being the target horizontal angle range and the second angle range being the target pitch angle range as an example, for the scanning rows in the blanking period, the scanning rows within the target pitch angle range (excluding the scanning rows with the maximum or minimum pitch angle) are subjected to effective detection row detection; for the scanning rows within the target pitch angle range, the detection point before the target horizontal angle range is subjected to distance detection to determine whether the scanning row is a valid detection row, and after determining that the scanning row is a valid detection row, the noise quantity statistics of the detection point are performed within the target horizontal angle range.

Step 502, traversing M test threshold values, to obtain M noise quantities, to form a noise quantity set.

During the $i^{th}$ threshold traversal, the noise quantity corresponding to each test threshold value is obtained in accordance with step 501. Each time a noise quantity corresponding to a test threshold value is obtained, the noise quantity is stored in a noise quantity set. By traversing M test threshold values, a noise quantity set including M noise quantities can be obtained.

In an embodiment, the process of determining a test threshold value during threshold traversal may include the following steps:

1. Obtaining a threshold initial value, a threshold end value, and a test step length during the $i^{th}$ threshold traversal period, where the threshold initial value is the first test threshold value during the $i^{th}$ threshold traversal period.

In order to enable the LiDAR to perform threshold traversal operations during operation, it is necessary to pre-configure the relevant baseline detection parameters for the LiDAR, which include at least the threshold initial value, the threshold end value, and the test step length. The threshold initial value is the first test threshold value during the threshold traversal period, the threshold end value is the last test threshold value during the threshold traversal period, and the test step length is the test difference between two adjacent test thresholds during the threshold traversal period.

As shown in FIG. 4, taking the threshold traversal order from large to small, and M is 10 as an example, the threshold initial value is the first test threshold value of the threshold traversal, the threshold end value is the $10^{th}$ test threshold value of the threshold traversal, and a difference between two adjacent test threshold values is the test step length.

In an embodiment, the baseline detection parameter may further include a quantity of valid detection rows that need to be counted for each test threshold value, when obtaining the noise quantity corresponding to each test threshold value.

At the beginning of each threshold traversal, the LiDAR needs to obtain the threshold initial value, the threshold end value, and the test step length during the $i^{th}$ threshold traversal, so that the first test threshold value of the threshold traversal can be determined based on the threshold initial value, the end time of this threshold traversal can be determined based on the threshold end value, and the next test threshold value can be determined based on the test step length and the current test threshold value.

A threshold initial value in an embodiment may be greater than the threshold end value, and the threshold traversal order is from large to small; or, the threshold initial value may be less than the threshold end value, and the threshold traversal order is from small to large.

2. When a noise quantity corresponding to the current test threshold value is obtained, the current test threshold value is compared with the threshold end value.

The LiDAR performs threshold traversal operation according to the baseline detection parameters, and counts the quantity of noises from the initial threshold value until the quantity of noises corresponding to the statistical end threshold value is reached, and this threshold traversal ends. When the quantity of noises corresponding to the current test threshold value is obtained, it is necessary to judge whether to end this threshold traversal, and to compare the relationship between the current test threshold value and the threshold end value.

3. When the current test threshold value is equal to the threshold end value, it is determined that the $i^{th}$ threshold traversal ends.

If the current test threshold value is equal to the threshold end value, it means that the quantity of noises corresponding to all test threshold values from the initial threshold value to the end threshold value has been counted, and it is determined that the $i^{th}$ threshold traversal is end, that is, the current threshold traversal is end.

4. When the current test threshold value is greater than the threshold end value, determine a next test threshold value based on the current test threshold value and the test step length.

If the current test threshold value is greater than the threshold end value, it means that not all test threshold values have been traversed, and it is necessary to continue the threshold traversal and perform noise statistics for a next test threshold value. Based on the difference between the current test threshold value and the test step length, a next test threshold value is determined, and a quantity of noise corresponding to the next test threshold value is counted.

Exemplarily, if the initial threshold value is A1, the end threshold value is A2, and the test step length is f, then the several test threshold values during the threshold traversal period can be expressed as: A1, A1−f, A1−2f, A1−(m−1)f . . . A2, where m represents the $m^{th}$ test threshold value.

Step 503: determining a test threshold value corresponding to the maximum noise quantity in the noise quantity set as the $i^{th}$ candidate baseline depression value, where i is a positive integer.

The implementation of step 503 may refer to step 202.

Step 504: determining a threshold down adjustment amount based on at least one candidate baseline depression value.

Step 505: determining a threshold following curve of the receiving device based on the threshold down adjustment amount.

In an embodiment, by counting multiple candidate noise values of the effective detection row to determine the noise quantity corresponding to the test threshold value, the influence of the detected target on the accuracy of the noise quantity statistics can be avoided. Moreover, by setting the first angle range, so that the LiDAR performs distance detection before the first angle range of each scanning row to determine whether the scanning row is a valid detection row, a certain detection range can be set for the effective detection row detection. After determining that the scanning row is a valid detection row, the noise quantity is counted within the first angle range, and the first angle range can be the middle angle range of the scanning row, which is more conducive to the detection of the baseline depression value. The effective detection row detection is configured for the scanning rows within the second angle range, so as to avoid the influence of the maximum pitch angle or the minimum pitch angle on the accuracy of the noise quantity statistics.

After each threshold traversal, a candidate baseline depression value is obtained. Whether the candidate baseline depression value can be used as the baseline depression value for subsequent threshold update requires further judgment on the candidate baseline depression value.

Figure 7:
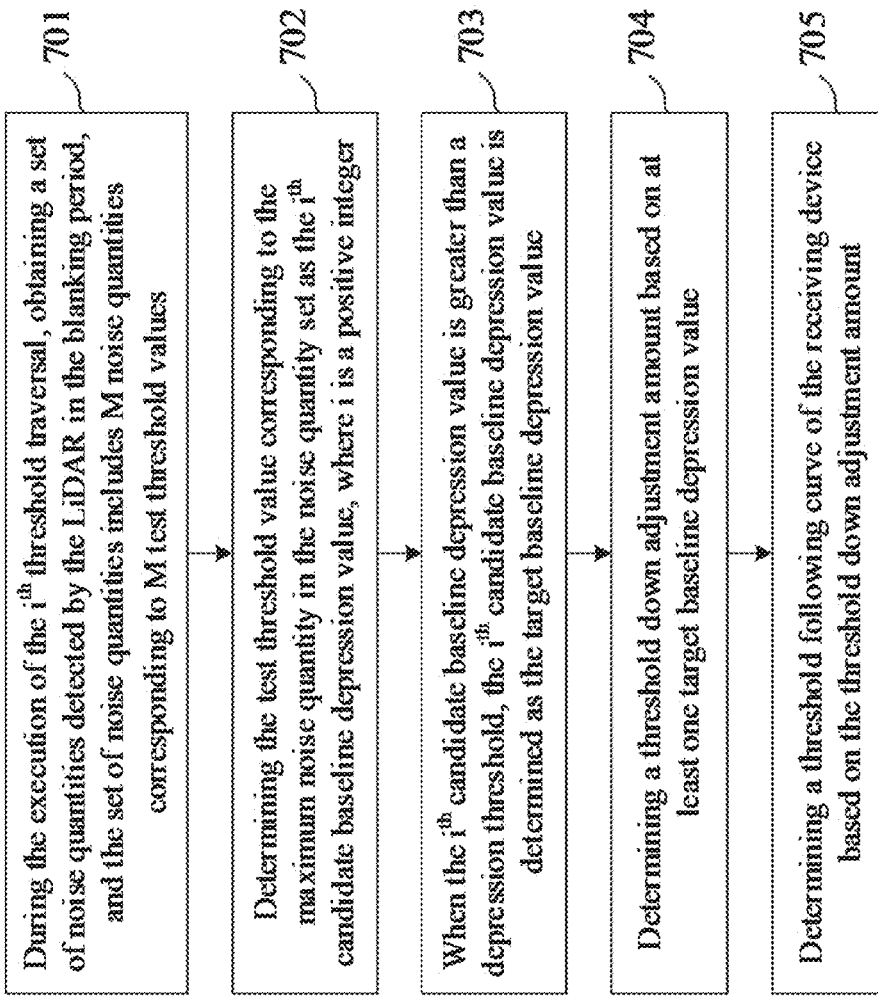
FIG. 7 is a schematic flow chart of another threshold adjustment method of a LiDAR provided in an embodiment of the present application.

FIG. 7 is a schematic flow chart of another threshold adjustment method of a LiDAR provided in an embodiment. Exemplarily, as shown in FIG. 7, the method 700 includes:

Step 701, during the execution of the $i^{th}$ threshold traversal, obtaining a set of noise quantities detected by the LiDAR in the blanking period, and the set of noise quantities includes M noise quantities corresponding to M test threshold values.

Step 702: determining the test threshold value corresponding to the maximum noise quantity in the noise quantity set as the $i^{th}$ candidate baseline depression value, where i is a positive integer.

step 701 and step 702 may refer to step 501 to step 503 in the above embodiment.

Step 703: when the $i^{th}$ candidate baseline depression value is greater than a depression threshold, the $i^{th}$ candidate baseline depression value is determined as the target baseline depression value.

If depression value obtained in this threshold traversal is small, it means that the baseline may not be abnormally low, or it is not enough to affect the accuracy of ranging, and there is no need to adjust the threshold. That is, when it is determined that the baseline is abnormally low, there is a need for dynamic adjustment of the threshold. In an implementation, after the $i^{th}$ threshold traversal is completed and the $i^{th}$ candidate baseline depression value is determined, it is necessary to judge the $i^{th}$ candidate baseline depression value according to a pre-set depression threshold to determine whether the baseline is abnormally low. If the $i^{th}$ candidate baseline depression value is greater than the depression threshold, it means that the baseline is abnormally low and will affect the accuracy of ranging, then the $i^{th}$ candidate baseline depression value is determined as the target baseline depression value, so as to dynamically adjust the threshold according to the target baseline depression value.

Step 704: determining a threshold down adjustment amount based on at least one target baseline depression value.

In order to avoid accidental errors in a single target baseline depression value, or to avoid large deviations in a target baseline depression value obtained at a certain time due to changes in the operating environment, in an implementation, a threshold down adjustment amount may be determined based on at least one determined target baseline depression value.

If need to determine the threshold down adjustment amount based on multiple target baseline depression values, and the multiple target baseline depression values require at least two threshold traversals to obtain, then in order to enable the threshold down adjustment amount to be determined subsequently based on the target baseline depression values obtained several times previously and the target baseline depression value currently obtained, a target storage area is pre-configured in the LiDAR for storing the target baseline depression value.

In an embodiment, in an exemplary example, step 704 may include step 704A and step 704B.

Step 704A, storing the target baseline depression value into the target storage area.

After each target baseline depression value is determined, a target baseline depression value is stored in the target storage area, to update the target baseline depression value stored in the target storage area, and then the threshold down adjustment amount is determined according to the p latest target baseline depression values in the target storage area.

In an embodiment, the quantity of target baseline depression values stored in the target storage area may be greater than or equal top, and the target storage area stores the target baseline depression values in accordance with the first-in-first-out principle. When storing a new target baseline depression value in the target storage area, it is necessary to determine how to store the target baseline depression value according to the storage state of the target storage area.

In an embodiment, step 704A may also include step 704A1 and step 704A2.

Step 704A1, when the target storage area is full of target baseline depression values, determine the target storage position corresponding to the earliest baseline depression value with the longest storage time in the target storage area; and write the target baseline depression value into the target storage position.

When storing the target baseline depression value, it is first necessary to determine whether the current target storage area is already full of target baseline depression values, and then determine how to store the target baseline depression value based on the determination result.

If it is determined that the target storage area is full of target baseline depression values and there is no free storage location to store the target baseline depression values, then in order to store new target baseline depression values without affecting other recently stored target baseline depression values, it is necessary to follow the first-in-first-out principle, determine the target storage location corresponding to the earliest baseline depression value with the longest storage time in the target storage area, and write the target baseline depression value into the target storage location. That is, when the target storage area is full of target baseline depression values, use the latest target baseline depression value to replace the earliest baseline depression value with the longest storage time.

Step 704A2: when the target storage area is not fully filled with the target baseline depression value, the target baseline depression value is written into an idle storage location in the target storage area.

If it is determined that the target storage area is not full of target baseline depression values, the target baseline depression value can be directly written into an idle storage location in the target storage area. For example, the target baseline depression value can be written into the next storage location of the last stored target baseline depression value, so that the target baseline depression value is stored in the target storage area in the order of writing.

Figure 8:
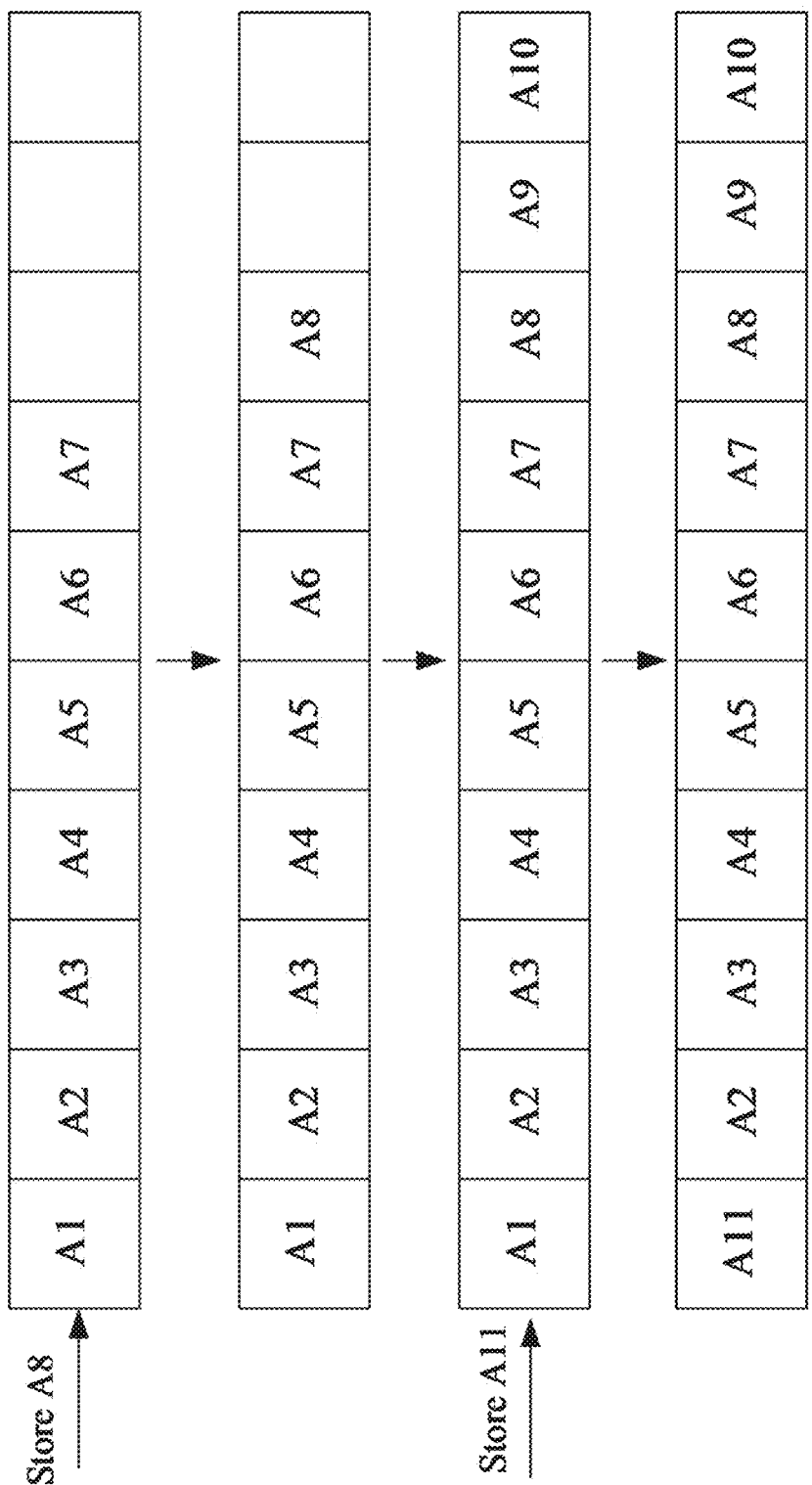
FIG. 8 is a schematic diagram of a storage process of a target baseline depression value provided in an embodiment of the present application.

FIG. 8 is a schematic diagram of a storage process of a target baseline depression value provided by an embodiment of the present application. As shown in FIG. 8, if there are 10 storage locations preset in the target storage area for storing target baseline depression values, when storing target baseline depression value A8, since the target storage area stores 7 target baseline depression values and is not full, target baseline depression value A8 can be stored in an idle storage location of the target storage area. When storing target baseline depression value A11, at this time, the target storage area is already full of 10 target baseline depression values, then it is determined that the target baseline depression value with the longest storage time in the target storage area is A1, and the target baseline depression value A11 is stored in the storage location where the target baseline depression value A1 is located. That is, the target baseline depression value A11 is used to cover the target baseline depression value A1.

Step 704B: determining a threshold down adjustment amount based on p target baseline depression values in the target storage area, where p is an integer greater than 1.

p is less than or equal to a quantity of storage locations in the target storage area, the target storage area can store greater than or equal to p target baseline depression values.

During the current operation of the LiDAR, after determining that the target storage area stores more than or equal to p target baseline depression values, the threshold down adjustment amount can be updated according to the p target baseline depression values with the most recent storage time in the target storage area.

In an embodiment, in order to further improve the accuracy of determining the threshold down adjustment amount, when updating the threshold reduction amount according to the p target baseline depression values in the target storage area, the deviations between the p target baseline depression values are first determined to remove the target baseline depression values with larger deviations, and then the updated threshold down adjustment amount is determined according to the remaining target baseline depression values.

Regarding the method of determining the threshold down adjustment amount based on p target baseline depression values: in one implementation, the threshold down adjustment amount can be determined based on the average value of the p target baseline depression values in the target storage area; the average value of the p target baseline depression values in the target storage area is determined, and the current threshold down adjustment amount is determined based on the average value and a factory depression value.

In an embodiment, a baseline depression relationship curve (the horizontal axis is time, and the vertical axis is the baseline depression value) can be fitted according to the p target baseline depression values, and then the predicted baseline depression value of the next frame can be predicted according to the baseline depression relationship curve, and then the current threshold down adjustment amount can be determined according to the predicted baseline depression value and the factory depression value.

Figure 9:
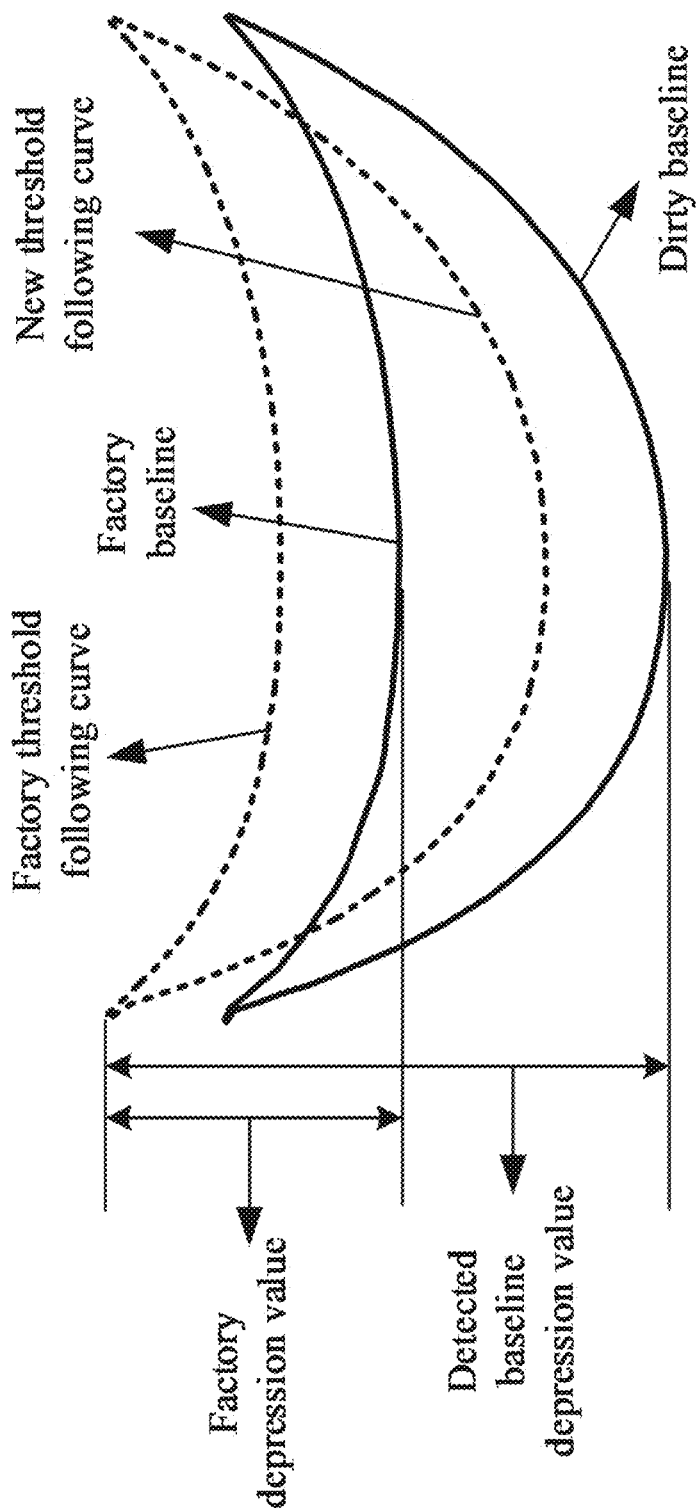
FIG. 9 is a schematic diagram of the relationship between a baseline depression value and a threshold down adjustment amount provided in an embodiment of the present application.

FIG. 9 is a schematic diagram of the relationship between a baseline depression value and a threshold down adjustment amount provided in an embodiment of the present application. As shown in FIG. 9, after the internal optical path of the LiDAR is dirty, the baseline depresses from the factory baseline to the dirty baseline. In order to maintain the standard deviation between the baseline and the threshold, the threshold following curve needs to be switched from the factory threshold following curve to the new threshold following curve. In an embodiment, the dirty baseline depression value (e.g., the baseline depression value detected in the figure) can be obtained by threshold traversal, and the threshold down adjustment amount (the threshold reduction amount is the same as the baseline down adjustment amount) can be determined based on the detected baseline depression value and the factory depression value, and then the updated threshold following curve is calculated.

Step 705: determining a threshold following curve of the receiving device based on the threshold down adjustment amount.

After determining the threshold down adjustment amount, the threshold down adjustment amount is input into the threshold following formula, to output a threshold following curve of the entire scan row. The updated threshold following curve can be imported during the operation of the LiDAR, and the updated threshold following curve is sent to the threshold drive control module. Before a start time of the next detection cycle, the updated threshold following curve is imported, so that when the next detection cycle performs scanning detection in the non-blanking period, the adjusted threshold value is used, and the detection result is more accurate.

In an embodiment, by setting a depression threshold, the relationship between the candidate baseline depression value obtained after each threshold traversal and the depression threshold is compared. If the candidate baseline depression value is greater than the depression threshold, a candidate baseline depression value is used as the target baseline depression value for subsequently determining the threshold down adjustment amount. Otherwise, the candidate baseline depression value is not saved, so that the subsequent threshold adjustment can be performed when the baseline is abnormally low, thereby reducing unnecessary threshold adjustment operations. In addition, a target storage area is set to store the target baseline depression value, so that the threshold can be dynamically adjusted according to multiple target baseline depression values obtained recently, thereby avoiding determining the threshold down adjustment amount based on a single target baseline depression value, and the threshold fluctuation caused by accidental errors can further improve the accuracy of the dynamic threshold adjustment.

During an initialization of the LiDAR operation, since the threshold traversal process has not yet been executed in this operation, the corresponding new threshold down adjustment amount has not been determined. If the baseline was abnormally low during the historical operation of the LiDAR (for example, the baseline was abnormally low due to internal optical path contamination), and the baseline was also abnormally low at the beginning of this LiDAR operation, if a factory threshold value is still used, the LiDAR's ranging ability will obviously be poor during the time period between the initialization of the operation and the first determination of the threshold down adjustment amount. In order to reduce the impact of the abnormally low baseline at the beginning of the LiDAR operation on the ranging, an embodiment provides a method for determining the threshold down adjustment amount during each initialization process of the LiDAR.

Figure 10:
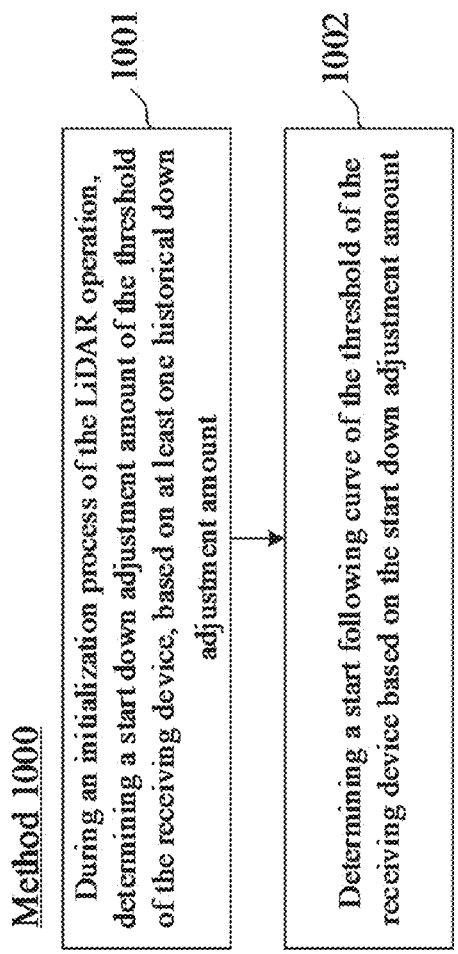
FIG. 10 is a schematic flow chart of another threshold adjustment method of a LiDAR provided in an embodiment of the present application.

FIG. 10 is a schematic flow chart of another threshold adjustment method of a LiDAR provided in an embodiment of the present application. As shown in FIG. 10, method 1000 includes:

Step 1001, during an initialization process of the LiDAR operation, determining a start down adjustment amount of the threshold of the receiving device, based on at least one historical down adjustment amount.

If the LiDAR has an abnormally low baseline, as the operating time increases, increasingly more dirt will accumulate on the internal optical path, the resulting leading edge will become larger, and the baseline depression value will gradually increase. Therefore, in order to avoid the problem of poor ranging performance caused by using the factory threshold value when the threshold value has not been refreshed when the LiDAR is started. In one implementation, during the initialization process of the LiDAR operation, at least one historical down adjustment amount of the LiDAR can be obtained to determine the starting down adjustment amount of the threshold of the receiving device.

In an embodiment, in order to enable the LiDAR to obtain at least one historical down adjustment amount during the operation initialization process, the LiDAR stores a threshold down adjustment amount as the historical down adjustment amount before the end of each operation.

Regarding the method of determining the threshold down adjustment amount stored before the end of each operation, the last threshold down adjustment amount of the LiDAR before the end of this operation can be determined as the historical down adjustment amount for storage; or the average value of multiple threshold down adjustment amounts obtained by the LiDAR during this operation can be stored as the historical down adjustment amount.

Exemplarily, if the LiDAR obtains a total of 10 threshold down adjustment amounts before the end of the operation, the $10^{th}$ threshold down adjustment amount can be determined as the historical down adjustment amount stored before the end of the current operation; or, the average value of the 10 threshold down adjustment amounts can be determined as the historical down adjustment amount stored before the end of the current operation; or, a threshold down adjustment amount change curve can be obtained by fitting the 10 threshold down adjustment amounts to determine the predicted threshold down adjustment amount corresponding to the next operating moment as the historical down adjustment amount to be stored.

Since the threshold down adjustment amount during the initialization of the current operation of the LiDAR is similar to or has a certain correlation with the historical down adjustment amounts at the end of the most recent historical operations, the LiDAR can determine a start down adjustment amount of the threshold during the operation initialization process based on at least one historical down adjustment amount.

The method of determining the start down adjustment amount of the threshold based on at least one historical down adjustment amount may include the following multiple steps. In an example, based on at least one historical down adjustment amount, the process of determining the start downward adjustment amount of the threshold of the receiving device may include any one of step 1001A, step 1001B, and step 1001C.

Step 1001A: determining the most recently stored historical down adjustment amount as the start down adjustment amount of the threshold of the receiving device.

In an implementation, the LiDAR may determine the most recently stored historical down adjustment amount as the start down adjustment amount of the threshold of the receiving device.

Exemplarily, during the initialization process of the $10^{th}$ operation of the LiDAR, the LiDAR can determine the historical down adjustment amount stored at the end of the $9^{th}$ operation as the starting down adjustment amount of the threshold during the initialization process of the $10^{th}$ operation.

Step 1001B: determining an average of at least two recently stored historical down adjustment amounts as the start down adjustment amount of the threshold of the receiving device.

In an embodiment, the LiDAR may obtain at least two recently stored historical down adjustment amounts, and determine the average value of the at least two recently stored historical down adjustment amounts as the start down adjustment amount of the threshold of the receiving device.

Exemplarily, during the initialization process of the LiDAR's $10^{th}$ operation, if a threshold down adjustment amount is stored as a historical down adjustment amount at the end of each operation during the first 9 operations, the 9 historical down adjustment amounts can be obtained when the LiDAR is initialized for the $10^{th}$ operation; the LiDAR can determine the start down adjustment amount of the threshold of the receiving device based on the average of the 9 historical reduction amounts; or, the LiDAR can determine the start down adjustment amount of the threshold of the receiving device based on the average of the 7 historical down adjustment amounts from the $3^{rd}$ to the $9^{th}$ time that have been stored most recently.

Step 1001C: determining a threshold down adjustment amount change curve of the receiving device based on at least two historical down adjustment amounts; and determine a start threshold down adjustment amount of the current receiving device based on the threshold down adjustment amount change curve.

Considering that the baseline depression value will gradually increase over time, the corresponding threshold down adjustment amount will slowly increase, so the threshold down adjustment amount during the current LiDAR operation may be greater than the historical down adjustment amount. In order to avoid the strong environmental foreshadowing during a certain historical operation due to bad weather (snow or rain), which may cause the baseline depression amount during the historical operation to be too large; in order to more accurately predict the start down adjustment amount at the beginning of the LiDAR operation, in an implementation, the LiDAR can fit the threshold down adjustment amount change curve of the receiving device based on at least two historical down adjustment amounts (the horizontal axis is time, and the vertical axis is the threshold down adjustment amount), and the corresponding threshold down adjustment amount of the current receiving device can be predicted based on the threshold down adjustment amount change curve. While satisfying the possibility of an increase in the threshold down adjustment amount, the historical down adjustment amount with a large deviation can be removed through curve fitting to improve the accuracy of determining the threshold down adjustment amount.

Figure 11:
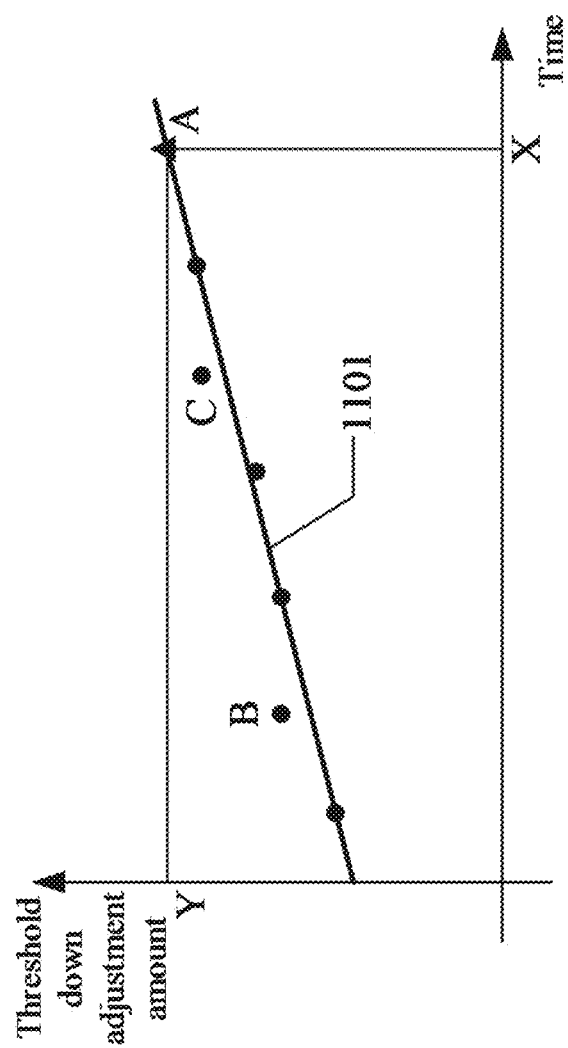
FIG. 11 is a schematic diagram of a process of predicting a start down adjustment amount of a threshold provided in an embodiment of the present application.

FIG. 11 is a schematic diagram of a process for predicting the start down adjustment amount of a threshold provided by an embodiment of the present application. As shown in FIG. 11, a threshold down adjustment amount change curve 1101 is obtained by fitting based on six historical down adjustment amounts (points shown by black circles in the figure), and the horizontal axis of the threshold down adjustment amount change curve 1101 is time, and the vertical axis is the threshold down adjustment amount (in the fitting process, the influence of the two historical down adjustment amounts B and C with large deviations on the prediction accuracy can be excluded). Correspondingly, based on the operating time X of the current receiving device and the threshold down adjustment amount change curve 1101, the start down adjustment amount Y (corresponding to point A in the figure) can be determined.

Step 1002: determining a start following curve of the threshold of the receiving device based on the start down adjustment amount.

After determining the start down adjustment amount of the threshold, the start following curve of the threshold of the receiving device can be output according to the threshold following formula and the start down adjustment amount, so that the start following curve can be used for distance detection in the time period between the initialization of this LiDAR operation and the first acquisition of the new threshold down adjustment amount.

In an embodiment, a threshold down adjustment amount is stored as a historical down adjustment amount before each operation of the LiDAR ends, so that in the subsequent LiDAR initialization process, the start down adjustment amount of the threshold and the start following curve can be determined based on at least one down adjustment amount, and the ranging processing is performed based on the start following curve before the new threshold down adjustment amount is obtained. Similar threshold down adjustment amounts can be compensated during the initial operation of the LiDAR, effectively improving the problem of inaccurate ranging caused by the abnormally low baseline during the initial operation.

Figure 12:
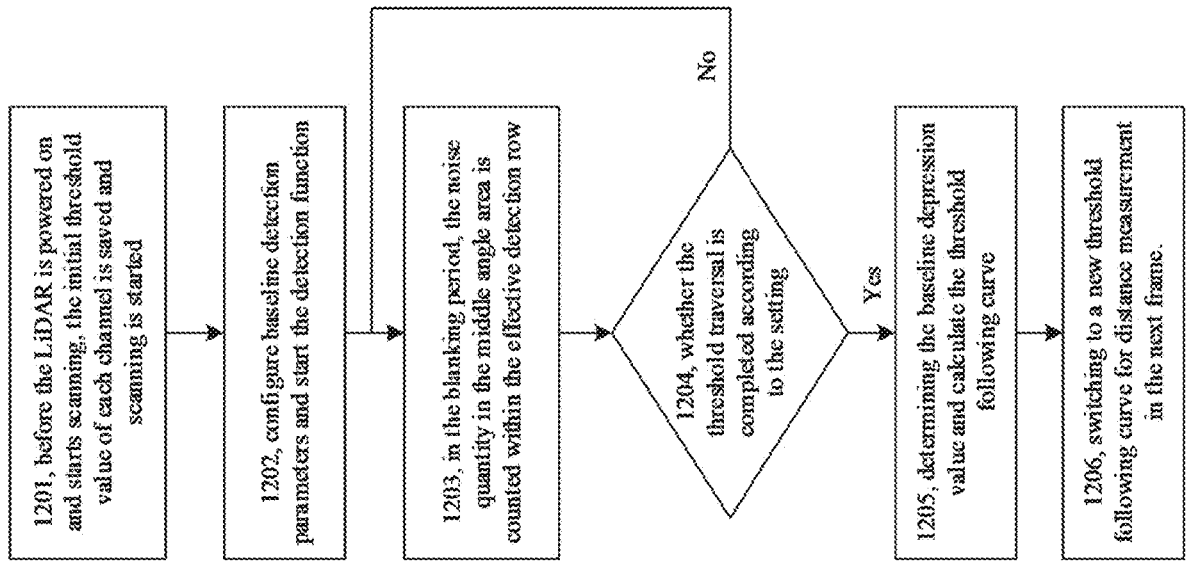
FIG. 12 is a schematic flow charts of another threshold adjustment method for a LiDAR provided in an embodiment of the present application.

FIG. 12 is a schematic flow chart of another threshold adjustment method of a LiDAR provided in an embodiment of the present application. The method includes:

1201, before the LiDAR is powered on and starts scanning, the initial threshold value of each channel is saved, and scanning is started.

After the LiDAR is turned on, before starting scanning, an initial threshold value of each channel is saved first. The initial threshold value is the threshold value calibrated when the LiDAR leaves the factory; each LiDAR may have multiple detection channels inside, and each detection channel is equipped with a set of LiDAR devices. That is, the threshold adjustment method can be independently executed in each detection channel.

1202, configuring baseline detection parameters and start the detection function.

The baseline detection parameters are configured for each channel, which may include the threshold initial value, the threshold end value, and the test step length; and the baseline depression value detection function is enabled.

1203, in the blanking period, the noise quantity in the middle angle area is counted within the effective detection row.

The noise quantity is counted for the effective detection rows in the blanking period. The effective detection rows are the scanning rows where no target is detected before the middle angle range.

In the scanning rows outside the effective detection row, the threshold value and other blanking period parameters of each channel are restored.

1204, determining whether the threshold traversal is completed according to the setting.

Based on the baseline detection parameters, determine whether a threshold traversal is completed.

1205, determining the baseline depression value and calculating the threshold following curve.

After baseline depression value is obtained, a new threshold following curve can be calculated.

1206, switching to a new threshold following curve for distance measurement in the next frame. Before the next frame, update the threshold following curve, so that distance measurement is performed based on the new threshold following curve during the next frame scanning process.

After the ranging capability test, when the internal optical path of the LiDAR is dirty, compared with the fixed threshold value, the threshold adjustment method of the LiDAR provided in the embodiment of the present application can detect more points and the target detection is more stable.

Figure 13:
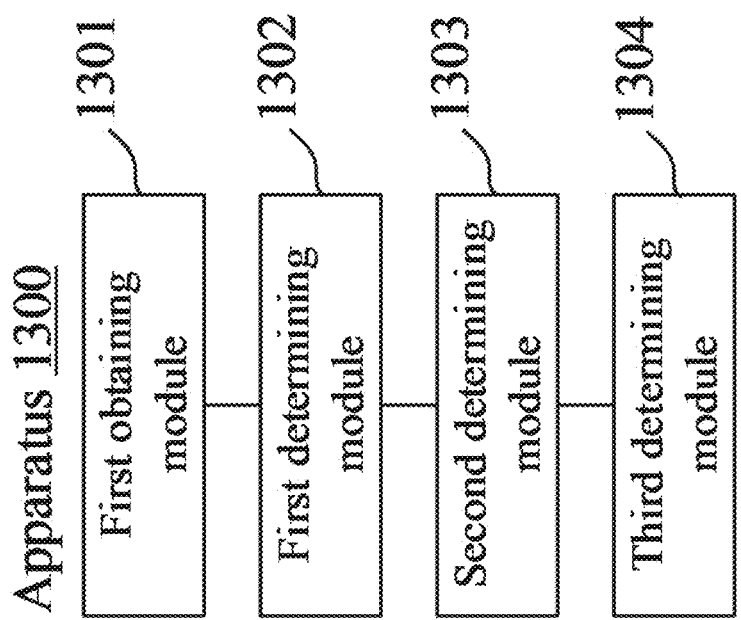
FIG. 13 is a schematic diagrams of the structure of a threshold adjustment apparatus for a LiDAR provided in an embodiment of the present application.

FIG. 13 is a schematic diagram of the structure of a threshold adjustment apparatus (device) for a LiDAR provided in an embodiment of the present application. As shown in FIG. 13, the apparatus 1300 includes the following components.

A first obtaining module 1301, used to obtain a set of noise quantities detected by the LiDAR in a blanking period during the execution of the $i^{th}$ threshold traversal, where the set of noise quantities includes M noise quantities corresponding to M test threshold values, where the blanking period is a time period from a scanning end position to a scanning start position within a detection cycle of the LiDAR, and the noise quantity is a signal quantity obtained by sampling a received signal output by a receiving device based on the test threshold value;

a first determining module 1302, used to determine the test threshold value corresponding to the maximum noise quantity in the noise quantity set as the $i^{th}$ candidate baseline depression value, where i is a positive integer;

a second determining module 1303, configured to determine a threshold down adjustment amount based on at least one of the candidate baseline depression values; and a third determining module 1304, configured to determine a threshold following curve of the receiving device based on the threshold down adjustment amount.

In an embodiment, the first obtaining module 1301 is configured to: during the execution of the $i^{th}$ threshold traversal, K candidate noise values based on the $m^{th}$ test threshold value in the blanking period are obtained, and an average value of the K candidate noise values is determined as the noise quantity of the $m^{th}$ test threshold value, where m is a positive integer less than or equal to M, and K is a positive integer; M test threshold values are traversed to obtain M noise quantities, to form the noise quantity set.

In an embodiment, the first obtaining module 1301 is configured to: determine a valid detection row among the scanning rows in the blanking period; and count K candidate noise values of the effective detection row according to the $m^{th}$ test threshold value.

In an embodiment, the first obtaining module 1301 is configured to: when the detection point of the LiDAR is located before the first angle range of the scanning row, performing distance detection; if the scanning row is before the first flat angle range, the distance between the detection points and the distance between adjacent detection points are different, the scanning row is determined as the valid detection row.

The first obtaining module 1301 is configured to: based on the $m^{th}$ test threshold value, count a quantity of noises of the detection points within the first angle range of at least one row of the effective detection row, to obtain K candidate noise values.

In an embodiment, the first obtaining module 1301 is configured to: when the scanning row of the LiDAR is within the second angle range, effective detection row detection is performed on the scanning row to determine the effective detection row in the scanning row.

In an embodiment, the apparatus includes: a second obtaining module is used to obtain a threshold initial value, a threshold end value, and a test step length during the $i^{th}$ threshold traversal, where the threshold initial value is the first test threshold value during the $i^{th}$ threshold traversal; a comparison module, configured to compare the current test threshold value with the threshold end value when the noise quantity corresponding to the current test threshold value is obtained; a fourth determining module, configured to determine that $i^{th}$ threshold traversal ends when the current test threshold value is equal to the threshold end value; and a fifth determining module is used to determine a next test threshold value based on the current test threshold value and the test step length, when the current test threshold value is greater than the threshold end value.

In an embodiment, the second determining module 1303 is configured to: when the $i^{th}$ candidate baseline depression value is greater than a depression threshold, determine the $i^{th}$ candidate baseline depression value as a target baseline depression value; and determine the threshold down adjustment amount based on at least one of the target baseline depression values.

In an embodiment, the second determining module 1303 is further configured to: store the target baseline depression value in a target storage area; and determine the threshold down adjustment amount based on p target baseline depression values in the target storage area, where p is an integer greater than 1.

In an embodiment, the second determining module 1303 is configured to: determine the threshold down adjustment amount based on an average value of p target baseline depression values in the target storage area.

In an embodiment, the second determining module 1303 is configured to: in the case that the target storage area is full of the target baseline depression values, determine a target storage location corresponding to the earliest baseline depression value with the longest storage time in the target storage area; and write the target baseline depression value into the target storage location; in a case where the target storage area is not fully filled with the target baseline depression value, write the target baseline depression value into an idle storage location in the target storage area.

In an embodiment, the apparatus includes: a sixth determining module used to determine, during the initialization process of the LiDAR operation, a start down adjustment amount of the threshold of the receiving device based on at least one historical down adjustment amount, where the LiDAR stores one of the threshold down adjustment amounts as the historical down adjustment amount before each operation ends; and a seventh determining module, used to determine a start following curve of the threshold of the receiving device based on the start down adjustment amount.

In an embodiment, the sixth determining module is configured to: determine the most recently stored historical down adjustment amount as the start down adjustment amount of the threshold of the receiving device; or, determine the average value of at least two of the historical down adjustment amounts stored most recently as the start down adjustment amount of the threshold of the receiving device; or, based on at least two of the historical down adjustment amounts, determine a threshold down adjustment amount variation curve of the receiving device; or, based on the threshold down adjustment amount variation curve, determine a start down adjustment amount of the threshold of the current receiving device.

In an embodiment, the sixth determining module is used to: take and store the last threshold down adjustment amount of the LiDAR before the end of this operation as the historical down adjustment amount; or, take and store an average value of the multiple threshold down adjustment amounts obtained by the LiDAR during this operation as the historical down adjustment amount.

Figure 14:
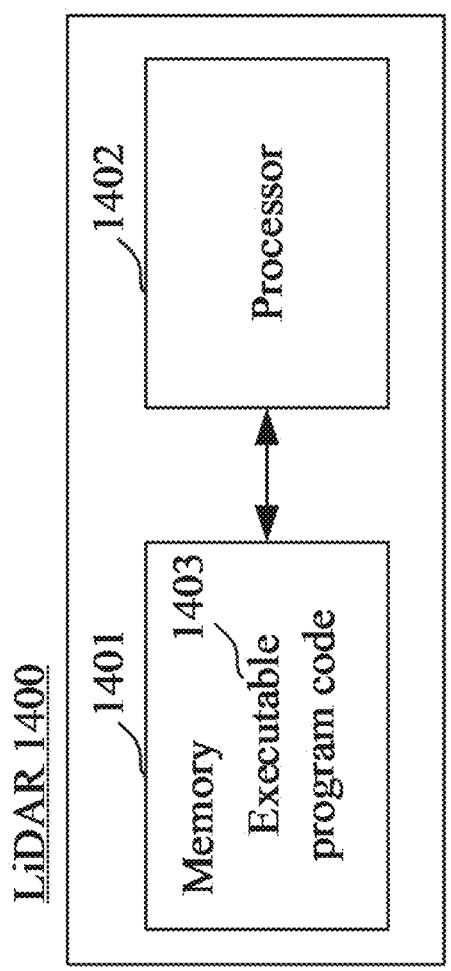
FIG. 14 is a schematic diagram of the structure of a LiDAR provided in an embodiment of the present application.

FIG. 14 is a schematic diagram of the structure of a LiDAR provided in an embodiment of the present application.

As shown in FIG. 14, the LiDAR 1400 includes: a memory 1401 and a processor 1402, where the memory 1401 stores an executable program code 1403, and the processor 1402 is used to call and execute the executable program code 1403 to perform the threshold adjustment method of the LiDAR.

An embodiment of the present application also provides a computer-readable storage medium, which stores a computer program code. When the computer program code runs on a LiDAR, the computer device executes the method steps to implement the threshold adjustment method of the LiDAR in the embodiment.

An embodiment also provides a computer program product. When the computer program product runs on a LiDAR, it enables the computer device to execute the steps to implement the threshold adjustment method of the LiDAR in the embodiment.

Through the description of the above implementation methods, technical personnel in the relevant field can understand that for the convenience and simplicity of description, only the division of the above-mentioned functional modules is used as an example. The above-mentioned functions can be assigned to different functional modules as needed, that is, the internal structure of the device can be divided into different functional modules to complete all or part of the functions described above.

The disclosed devices and methods can be implemented in other ways. For example, the device embodiments described above are only schematic, for example, the division of modules or units is only a logical function division, and there may be other division methods in actual implementation, such as multiple units or components can be combined or integrated into another device, or some features can be ignored or not executed. Another point is that the mutual coupling or direct coupling or communication connection shown or discussed can be through some interfaces, indirect coupling or communication connection of devices or units, which can be electrical, mechanical, or other forms.

What is claimed is:
1. A method for threshold adjustment of a LiDAR, wherein the method comprises:
configuring baseline detection parameters and starting a detection function to obtain test threshold values, wherein the baseline detection parameters include a threshold initial value, a threshold end value, and a test step length, wherein the threshold initial value is a first test threshold value during an $i^{th}$ threshold traversal and is a factory-calibrated threshold value, and wherein the test step length is a difference between two adjacent test threshold values during the $i^{th}$ threshold traversal;
during the execution of the $i^{th}$ threshold traversal, obtaining a set of noise quantities detected by the LiDAR in a blanking period, wherein the set of noise quantities includes M noise quantities corresponding to M test threshold values, the blanking period is a time period from a scanning end position to a scanning start position within a detection cycle of the LiDAR, and the noise quantity is a signal quantity obtained by sampling a received signal output by a receiving device based on the M test threshold values;
determining a test threshold value corresponding to a maximum value of the noise quantity in the set of noise quantities as an $i^{th}$ candidate baseline depression value, wherein i is a positive integer, and wherein the $i^{th}$ candidate baseline depression value is the current baseline value of the receiving device;

when the i$^{th}$ candidate baseline depression value is greater than a depression threshold, determining the i$^{th}$ candidate baseline depression value as a target baseline depression value;

storing target baseline depression values into a target storage area;

determining a threshold down adjustment amount based on p target baseline depression values in the target storage area, wherein p is an integer greater than 1;

determining a threshold following curve of the receiving device based on the threshold down adjustment amount; and performing a distance measurement based on the threshold following curve during a next detection cycle.

2. The method according to claim 1, wherein, during the execution of the i$^{th}$ threshold traversal, obtaining the set of noise quantities detected by the LiDAR in the blanking period comprises:

during the execution of the i$^{th}$ threshold traversal, obtaining K candidate noise values in the blanking period based on a m$^{th}$ test threshold value, and an average value of the K candidate noise values is determined as the noise quantity of the m$^{th}$ test threshold value, wherein m is a positive integer less than or equal to M, and K is a positive integer; and traversing M test threshold values to obtain M noise quantities, to form the set of noise quantities.

3. The method according to claim 2, wherein obtaining the K candidate noise values in the blanking period based on the m$^{th}$ test threshold value comprises:

determining valid detection rows in the blanking period, wherein the valid detection rows are scanning rows where a target is not detected; and counting the K candidate noise values of the valid detection rows according to the m$^{th}$ test threshold value.

4. The method according to claim 3, wherein determining the valid detection rows in the blanking period comprises:

for each scanning row in the blanking period, when a detection point of the LiDAR is located before a first angle range of a scanning row, performing distance detection, and in response to the scanning row being before the first angle range, and distance values of a detection point and an adjacent detection point being different, determining the scanning row as a valid detection row; and counting the K candidate noise values of the valid detection rows according to the m$^{th}$ test threshold value comprises:

based on the m$^{th}$ test threshold value, counting a noises quantity of the detection points within the first angle range of at least one row of the valid detection rows, to obtain K candidate noise values.

5. The method according to claim 3, wherein, before determining the valid detection row among the scanning rows in the blanking period, the method further comprises:

in response to the scanning rows of the LiDAR being within a second angle range, performing valid detection row detection on the scanning rows.

6. The method according to claim 2, further comprising:

obtaining a threshold initial value, a threshold end value, and a test step length during the i$^{th}$ threshold traversal, wherein the threshold initial value is a first test threshold value during the i$^{th}$ threshold traversal;

when the noise quantity corresponding to a current test threshold value is obtained, comparing the current test threshold value with the threshold end value;

when the current test threshold value is equal to the threshold end value, determining that the i$^{th}$ threshold traversal ends; and when the current test threshold value is greater than the threshold end value, determining a next test threshold value based on the current test threshold value and the test step size.

7. The method according to claim 1, wherein determining the threshold down adjustment amount based on p target baseline depression values in the target storage area comprises:

determining the threshold down adjustment amount, based on an average value of the p target baseline depression values in the target storage area.

8. The method according to claim 1, wherein storing the target baseline depression value in a target storage area comprises:

when the target storage area is full of the target baseline depression values, determining a target storage location corresponding to the earliest baseline depression value with the longest storage time in the target storage area, and writing the target baseline depression value into the target storage location; and when the target storage area is not fully filled with the target baseline depression value, writing the target baseline depression value into an idle storage location in the target storage area.

9. The method according to claim 1, further comprising:

during an initialization process of the LiDAR, based on at least one historical down adjustment amount, determining a start down adjustment amount of the threshold of the receiving device, wherein the LiDAR stores one of the threshold down adjustment amounts as the historical down adjustment amount before each operation ends; and determining an initial following curve of the threshold of the receiving device, based on the start down adjustment amount.

10. The method according to claim 9, wherein determining the start down adjustment amount of the threshold of the receiving device comprises at least one of the following:

determining a last stored historical down adjustment amount as the start down adjustment amount of the threshold of the receiving device;

determining an average value of at least two last stored of the historical down adjustment amounts as the start down adjustment amount of the threshold of the receiving device;

based on at least two of the historical down adjustment amounts, determining a threshold down adjustment amount change curve of the receiving device; or based on the threshold down adjustment amount change curve, determining the start down adjustment amount of the threshold of the receiving device.

11. The method according to claim 9, wherein the LiDAR stores one of the threshold down adjustment amounts as the historical down adjustment amount before each operation ends comprising:

taking and storing the last threshold down adjustment amount of the LiDAR before the end of this operation, as the historical down adjustment amount; or taking and storing an average value of multiple threshold down adjustment amounts obtained by the LiDAR during this operation, as the historical down adjustment amount.

12. A LiDAR, comprising:

a memory, configured to store executable program codes; and a processor, configured to call and run the executable program codes from the memory so that the LiDAR executes operations comprising:

configuring baseline detection parameters and starting a detection function to obtain test threshold values, wherein the baseline detection parameters include a threshold initial value, a threshold end value, and a test step length, wherein the threshold initial value is a first test threshold value during an $i^{th}$ threshold traversal and is a factory-calibrated threshold value, and wherein the test step length is a difference between two adjacent test threshold values during the $i^{th}$ threshold traversal;

during the execution of the $i^{th}$ threshold traversal, obtaining a set of noise quantities detected by the LiDAR in a blanking period, wherein the set of noise quantities includes M noise quantities corresponding to M test threshold values, the blanking period is a time period from a scanning end position to a scanning start position within a detection cycle of the LiDAR, and the noise quantity is a signal quantity obtained by sampling a received signal output by a receiving device based on the M test threshold values;

determining a test threshold value corresponding to a maximum value of the noise quantity in the set of noise quantities as an $i^{th}$ candidate baseline depression value, wherein i is a positive integer, and wherein the $i^{th}$ candidate baseline depression value is the current baseline value of the receiving device;

when the $i^{th}$ candidate baseline depression value is greater than a depression threshold, determining the $i^{th}$ candidate baseline depression value as a target baseline depression value;

storing target baseline depression values into a target storage area;

determining a threshold down adjustment amount based on p target baseline depression values in the target storage area, wherein p is an integer greater than 1;

determining a threshold following curve of the receiving device based on the threshold down adjustment amount; and performing a distance measurement based on the threshold following curve during a next detection cycle.

13. A non-transitory computer-readable storage medium, storing a computer program, when the computer program is executed by a LiDAR, implements operations comprising:

configuring baseline detection parameters and starting a detection function to obtain test threshold values, wherein the baseline detection parameters include a threshold initial value, a threshold end value, and a test step length, wherein the threshold initial value is a first test threshold value during an $i^{th}$ threshold traversal and is a factory-calibrated threshold value, and wherein the test step length is a difference between two adjacent test threshold values during the $i^{th}$ threshold traversal;

during the execution of the $i^{th}$ threshold traversal, obtaining a set of noise quantities detected by the LiDAR in a blanking period, wherein the set of noise quantities includes M noise quantities corresponding to M test threshold values, the blanking period is a time period from a scanning end position to a scanning start position within a detection cycle of the LiDAR, and the noise quantity is a signal quantity obtained by sampling a received signal output by a receiving device based on the M test threshold values;

determining a test threshold value corresponding to a maximum value of the noise quantity in the set of noise quantities as an $i^{th}$ candidate baseline depression value, wherein i is a positive integer, and wherein the $i^{th}$ candidate baseline depression value is the current baseline value of the receiving device;

when the $i^{th}$ candidate baseline depression value is greater than a depression threshold, determining the $i^{th}$ candidate baseline depression value as a target baseline depression value;

storing target baseline depression values into a target storage area;

determining a threshold down adjustment amount based on p target baseline depression values in the target storage area, wherein p is an integer greater than 1;

determining a threshold following curve of the receiving device based on the threshold down adjustment amount; and performing a distance measurement based on the threshold following curve during a next detection cycle.

\* \* \* \* \*